US012320259B2

(12) United States Patent
Jothiprasad et al.

(10) Patent No.: US 12,320,259 B2
(45) Date of Patent: Jun. 3, 2025

(54) COMPACT BLEED VALVE ASSEMBLIES

(71) Applicant: General Electric Company, Schenectady, NY (US)

(72) Inventors: Giridhar Jothiprasad, Clifton Park, NY (US); Christopher E. LaMaster, Franklin, OH (US); Jeffrey D. Carnes, Framingham, MA (US); Thomas Malkus, Albany, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/850,582

(22) Filed: Jun. 27, 2022

(65) Prior Publication Data
US 2023/0417155 A1 Dec. 28, 2023

(51) Int. Cl.
F01D 17/14 (2006.01)
(52) U.S. Cl.
CPC ...... *F01D 17/145* (2013.01); *F05D 2260/606* (2013.01)
(58) Field of Classification Search
CPC .................. F01D 17/145; F05D 2260/606
(Continued)

(56) References Cited

U.S. PATENT DOCUMENTS 3,057,541 A 10/1962 Augustus et al.
3,227,241 A 1/1966 Mattoon
(Continued)

FOREIGN PATENT DOCUMENTS

DE 1114979 B 10/1961
FR 3129428 A1 5/2023
(Continued)

OTHER PUBLICATIONS

Pelat et al., "The Acoustic Black Hold: A Review of Theory and Applications," ELSEVIER, Journal of Sound and Vibration, 476, 115316, Mar. 18, 2020, 24 pages.
(Continued)

*Primary Examiner* — Woody A Lee, Jr.
*Assistant Examiner* — Justin A Pruitt
(74) *Attorney, Agent, or Firm* — Hanley, Flight & Zimmerman, LLC

(57) ABSTRACT

Compact bleed valve assemblies are disclosed. An example turbine engine comprises a rotor blade having an axial chord (C) measured at a tip of the rotor blade, and a variable bleed valve (VBV) including a VBV port defining a bleed flow-path and an exit angle ($\beta_{exit}$) for bleed air exiting the VBV port, the VBV port including a forward entrance edge and an aft exit edge and a first length (LA) therebetween, and a VBV door corresponding to the VBV port, the VBV door to generate a bleed cavity having a bleed cavity area (BA) in the VBV port when the VBV is in a closed position, the VBV door to move between an open position and the closed position at a rotation angle ($\Delta\theta$), the VBV door to extend a distance ($LA_{act}$) beyond the first length (LA), wherein $$\frac{LA + LA_{act}}{C} - 2*(BVIP + 0.15)^{-1.35} \leq -0.8,$$

and wherein $$BVIP = 0.15 * \frac{BA}{C^2} + 0.85 * \frac{\Delta\theta + \beta_{exit}}{2\pi}.$$

20 Claims, 13 Drawing Sheets

(58) Field of Classification Search
USPC .......................................................... 415/144
See application file for complete search history.

(56) References Cited

U.S. PATENT DOCUMENTS

| | | | |
|---|---|---|---|
| 3,291,420 | A | 12/1966 | Liang |
| 3,588,268 | A | 6/1971 | Hampton |
| 3,638,428 | A | 2/1972 | Shipley et al. |
| 3,898,799 | A | 8/1975 | Pollert et al. |
| 4,086,761 | A | 5/1978 | Schaut et al. |
| 4,175,384 | A | 11/1979 | Wagenknecht et al. |
| 4,463,552 | A | 8/1984 | Monhardt et al. |
| 4,698,964 | A | 10/1987 | Glancy |
| 5,123,240 | A | 6/1992 | Frost et al. |
| 5,845,482 | A | 12/1998 | Carscallen |
| 6,048,171 | A | 4/2000 | Donnelly et al. |
| 6,565,313 | B2 | 5/2003 | Nikkanen et al. |
| 6,981,842 | B2 | 1/2006 | D'Angelo et al. |
| 7,017,706 | B2 | 3/2006 | Brown et al. |
| 7,249,735 | B2 | 7/2007 | Amorosi et al. |
| 7,594,403 | B2 | 9/2009 | Cadieux |
| 8,590,308 | B2 | 11/2013 | Kirby |
| 8,683,812 | B2 | 4/2014 | Bertolotti et al. |
| 8,690,521 | B2 | 4/2014 | Colotte et al. |
| 8,931,284 | B2 | 1/2015 | Hussain et al. |
| 9,175,577 | B2 | 11/2015 | Papamoschou et al. |
| 9,518,513 | B2 | 12/2016 | Pritchard, Jr. et al. |
| 9,623,354 | B2 | 4/2017 | Kumar et al. |
| 9,638,201 | B2 | 5/2017 | LeBlanc et al. |
| 9,657,844 | B2 | 5/2017 | Hrdlichka et al. |
| 9,879,611 | B2 | 1/2018 | Morin et al. |
| 9,982,598 | B2 * | 5/2018 | Pritchard, Jr. ............ F02C 9/28 |
| 10,024,228 | B2 | 7/2018 | Gong et al. |
| 10,208,676 | B2 | 2/2019 | Johnson et al. |
| 10,215,047 | B2 | 2/2019 | Moniz et al. |
| 10,260,427 | B2 | 4/2019 | Buey et al. |
| 10,287,992 | B2 | 5/2019 | Tan et al. |
| 10,704,726 | B2 | 7/2020 | Lin et al. |
| 10,830,179 | B2 | 11/2020 | Hatim |
| 11,149,643 | B2 | 10/2021 | Schwarz et al. |
| 2002/0139900 | A1 | 10/2002 | Porte et al. |
| 2007/0137175 | A1 | 6/2007 | Moniz |
| 2010/0223903 | A1 | 9/2010 | Starr |
| 2012/0070271 | A1 | 3/2012 | Urban et al. |
| 2012/0288359 | A1 | 11/2012 | Pichel |
| 2013/0340440 | A1 | 12/2013 | LeBlanc et al. |
| 2014/0034416 | A1 | 2/2014 | Liu |
| 2014/0075956 | A1 | 3/2014 | Patsouris |
| 2020/0017189 | A1 | 1/2020 | Kruckenberg |
| 2020/0232357 | A1 | 7/2020 | Bertoldi et al. |
| 2020/0332725 | A1 | 10/2020 | Smith et al. |
| 2021/0131352 | A1 | 5/2021 | Pascu et al. |
| 2023/0212989 | A1 | 7/2023 | Malkus et al. |
| 2023/0228219 | A1 | 7/2023 | Zheng et al. |

FOREIGN PATENT DOCUMENTS

| | | | |
|---|---|---|---|
| FR | 3129432 | A1 | 5/2023 |
| FR | 3130879 | A1 | 6/2023 |
| FR | 3130894 | A1 | 6/2023 |
| FR | 3132743 | A1 | 8/2023 |
| GB | 785955 | A | 11/1957 |

OTHER PUBLICATIONS

Xiaoqi et al., "Broadband and Low Frequency Sound Absorption by Sonic Black Holes With Micro-Perforated Boundaries," ScienceDirect, Journal of Sound and Vibration, vol. 512, 116401, Nov. 10, 2021, 17 pages.

Mousavi et al., "How The Waveguide Acoustic Black Hole Works: A Study of Possible Dampening Mechanisms," The Journal of the Acoustical Society of America. Volume 151, 4279-4290, Jun. 29, 2022, 13 pages.

Bravo et al., "Broadband Sound Attenuation and Absorption by Duct Silencers Based on the Acoustic Black Hole Effect: Simulations and Experiments," ELSVIER, Journal of Sound and Vibration, May 26, 2023, 34 pages.

* cited by examiner

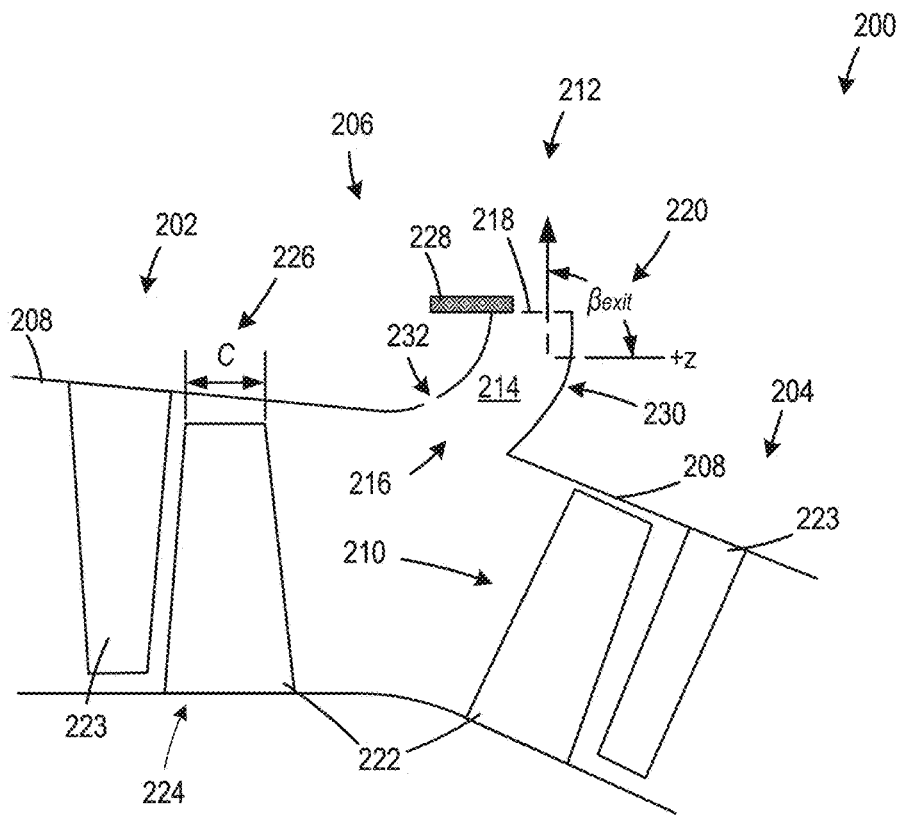
FIG. 2A
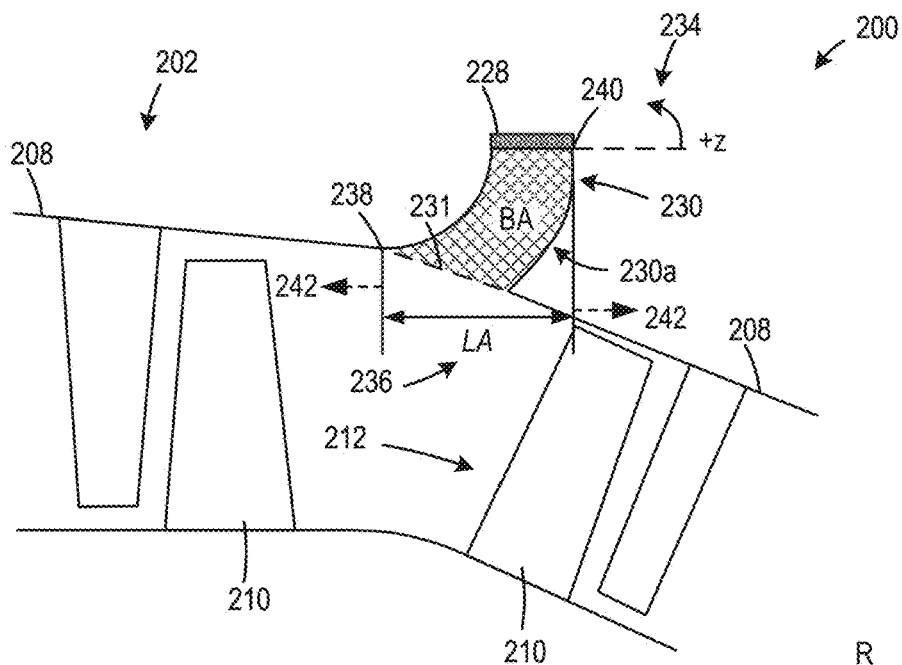
FIG. 2B
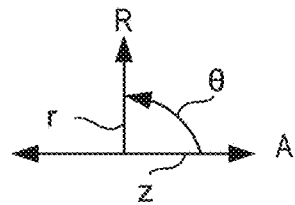

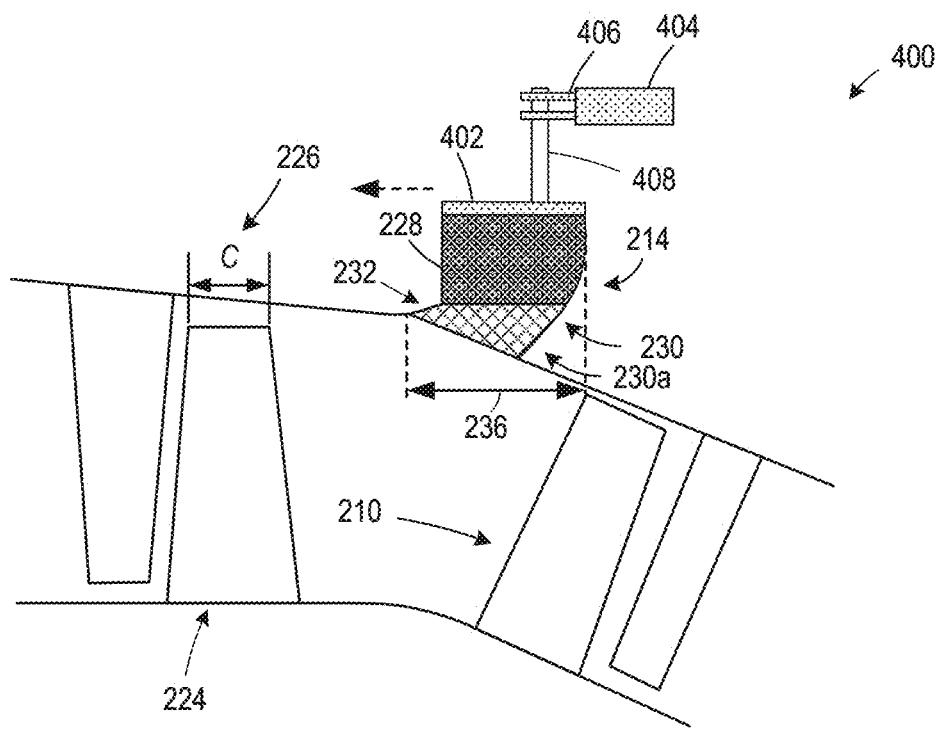
FIG. 4A
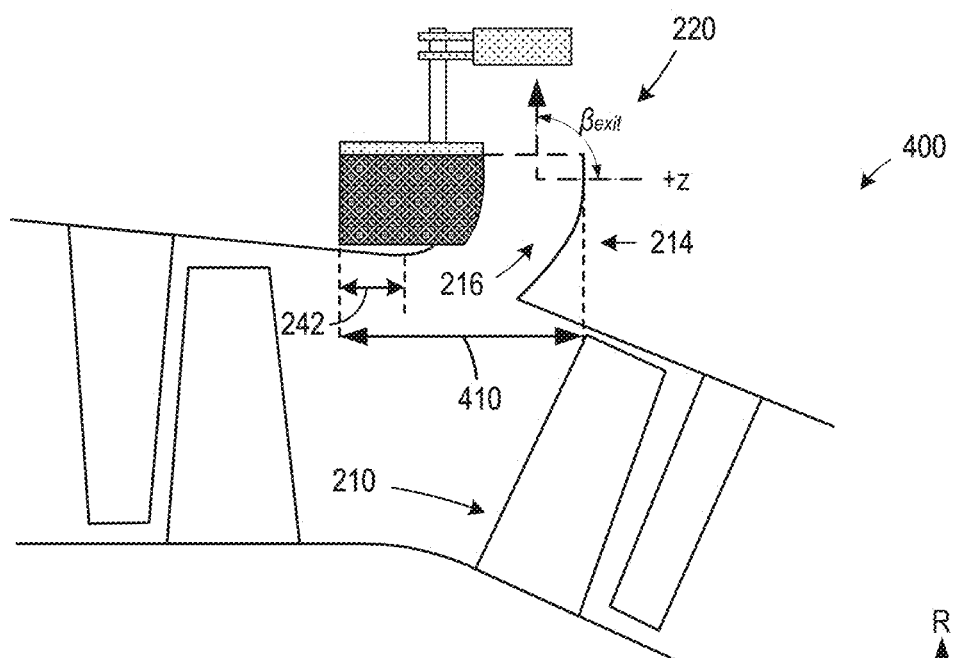
FIG. 4B
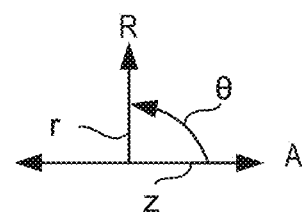

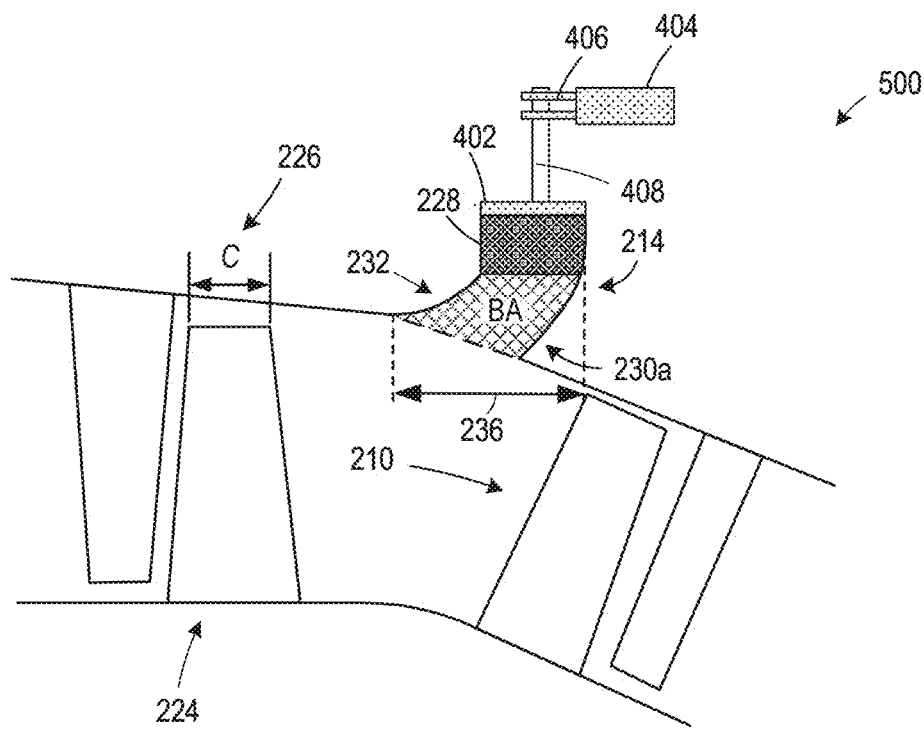
FIG. 5A
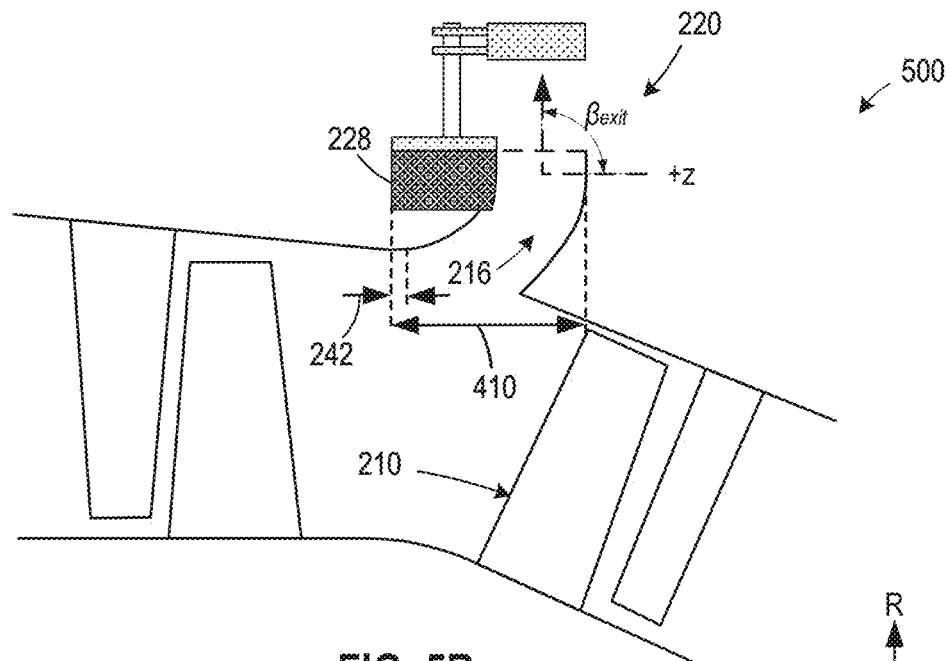
FIG. 5B
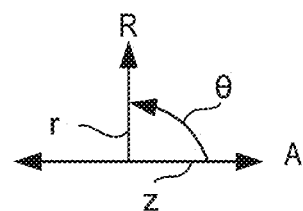

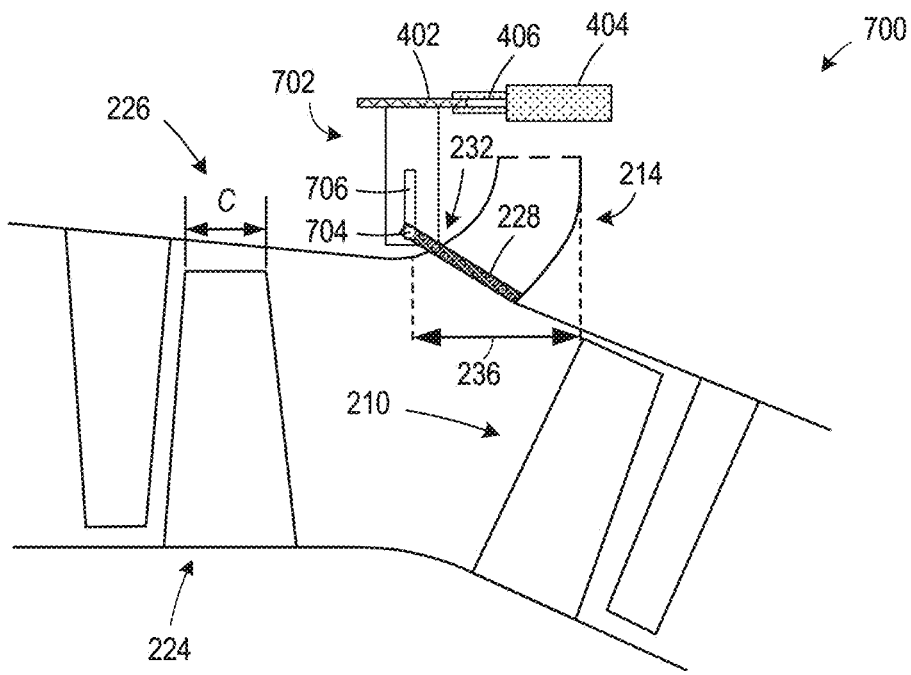
FIG. 7A
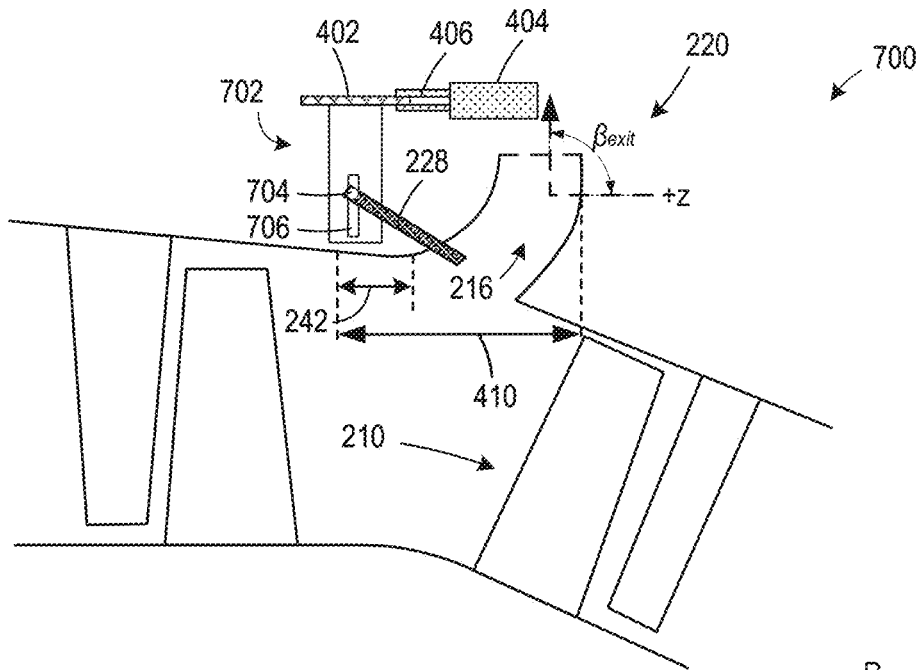
FIG. 7B
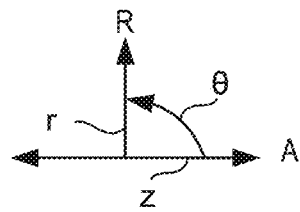

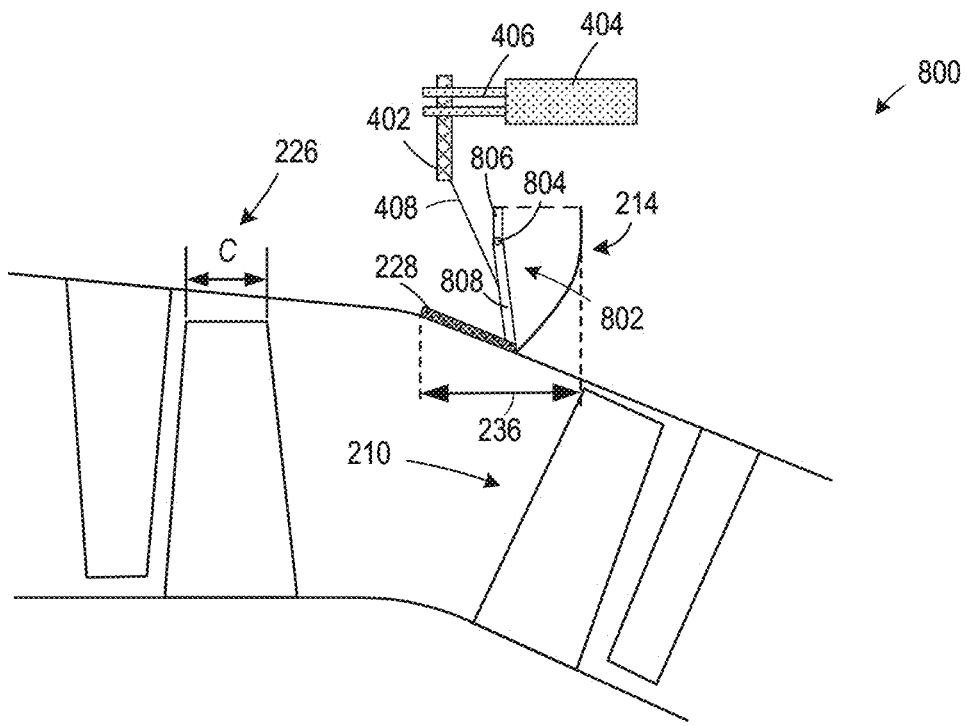
FIG. 8A
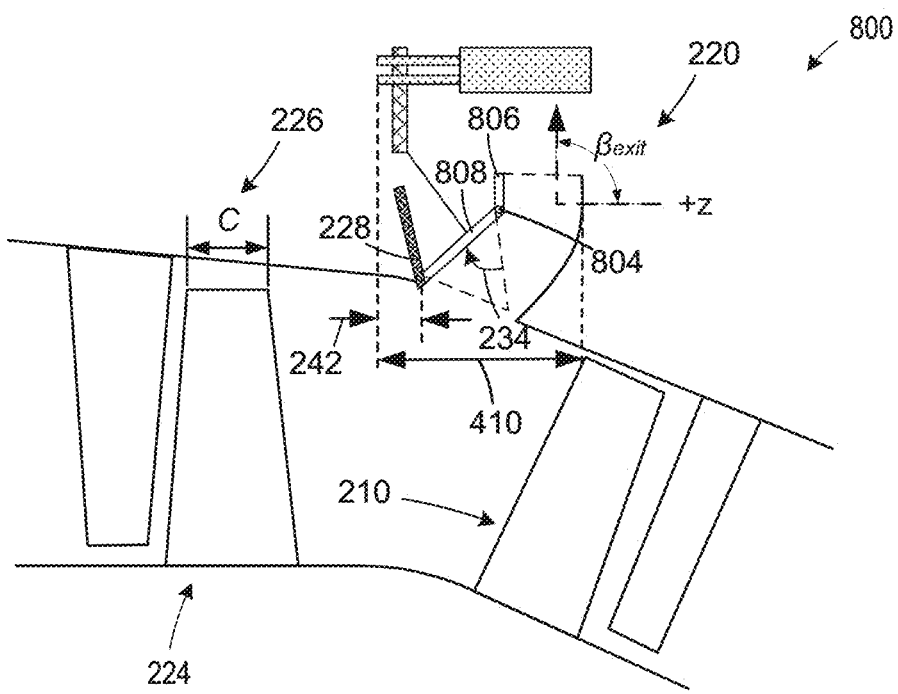
FIG. 8B
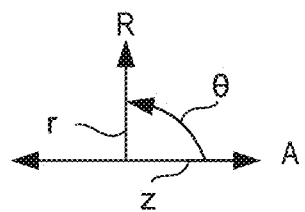

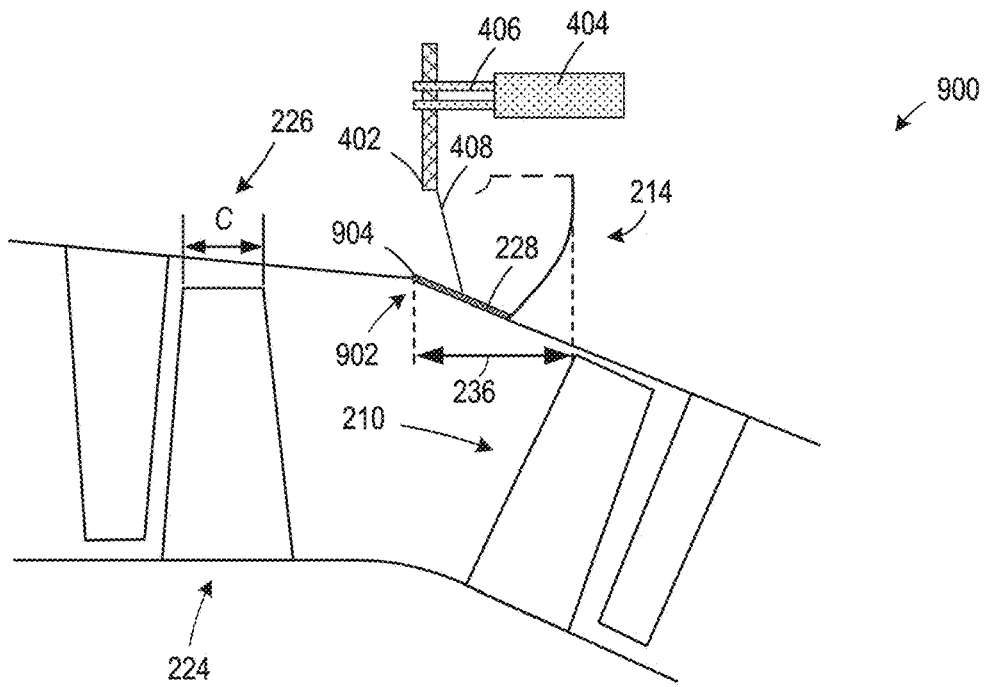
FIG. 9A
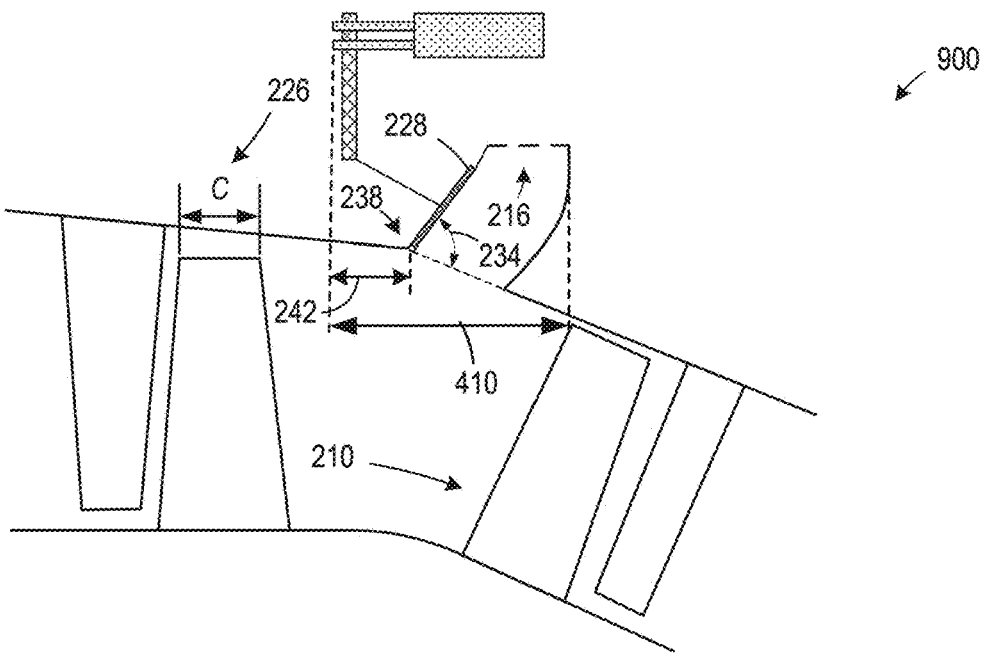
FIG. 9B
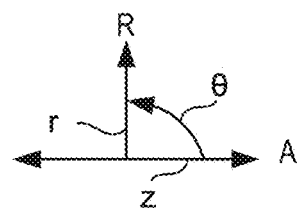

COMPACT BLEED VALVE ASSEMBLIES

FIELD OF THE DISCLOSURE

This disclosure relates generally to turbine engines and, more particularly, to compact bleed valve assemblies.

BACKGROUND

Turbine engines are often utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

FIGS. 2A-2B illustrate partial cross-sectional views of an example compressor of a turbine engine including a variable bleed valve assembly.

FIGS. 4A-4B illustrate an example variable bleed valve assembly structured in accordance with the teachings of this disclosure.

FIGS. 5A-5B illustrate another example variable bleed valve assembly structured in accordance with the teachings of this disclosure.

FIGS. 7A-7B illustrate another example variable bleed valve assembly structured in accordance with the teachings of this disclosure.

FIGS. 8A-8B illustrate another example variable bleed valve assembly structured in accordance with the teachings of this disclosure.

FIGS. 9A-9B illustrate another example variable bleed valve assembly structured in accordance with the teachings of this disclosure.

Figure 1:
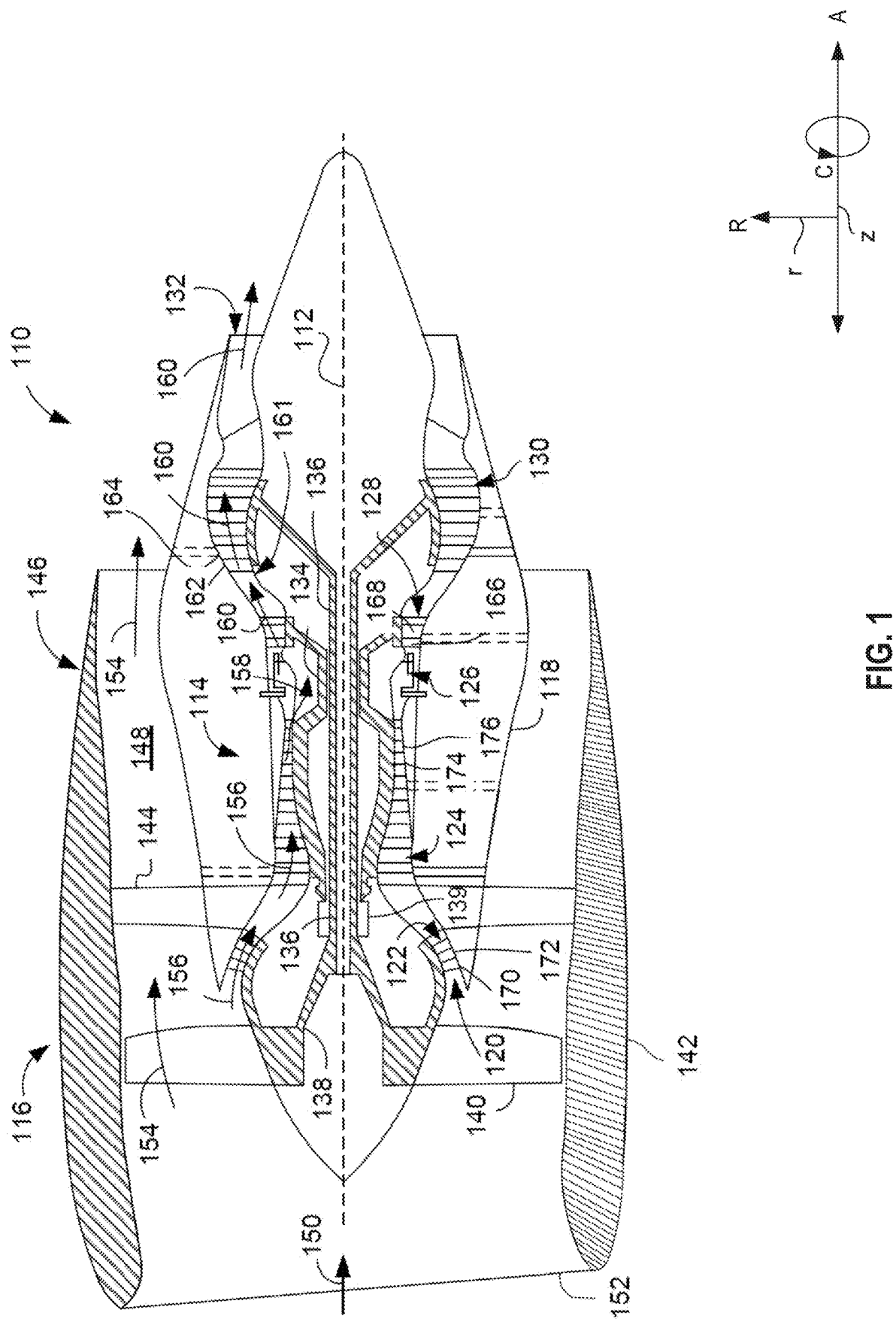
FIG. 1 is a cross-sectional view of an example gas turbine.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially same relationship is within three degrees of being the same, a substantially flush relationship is within three degrees of being flush, etc.). In some examples used herein, the term "substantially" is used to describe a value that is within 10% of the stated value.

In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

Various terms are used herein to describe the orientation of features. In general, the attached figures are annotated with a set of axes including an axis of rotation (e.g., axial axis) z and a radial axis r. In general, the attached figures are annotated with reference to an axial direction A, a radial direction R, and/or a circumferential direction C of the vehicle associated with the features, forces and moments. The axial direction refers to a direction parallel to the axis of rotation z about which the rotating components of a turbine engine rotate. The radial direction refers to a direction that is perpendicular to the axis of rotation and points towards (radially inward) or away from (radially outward) the axis of rotation. The circumferential direction at a given point is a direction that is normal to a local radial direction and normal to the axial direction. Reference is made to a meridional plane, which is a plane defined by a constant polar angle in cylindrical coordinates. The meridional plane refers to the plane formed by the axis of rotation and the radial axis.

The term "variable bleed valve" refers to an assembly of components that enable a turbine engine to bleed air from a compressor section of the turbine engine during operation. A variable bleed valve includes at least a port defining a bleed flowpath and a door to open and close the port.

The term "bleed cavity" refers to an opening within the port when the variable bleed valve is in a closed position caused by the door being non-flush with a casing of the compressor section.

The term "bleed cavity area" refers to a cross-sectional area of the bleed cavity in the meridional plane when variable bleed valve is in the closed position.

The term "axial port length" refers to a distance in an axial direction from an entrance lip of the port to an aft lip of the port.

The term "axial actuation length" refers to a distance in the axial direction that the door translates forward of the entrance lip or aft of the exit lip to bleed air from the port.

The term "chord" refers to a length of a tip of a rotor blade of a first array of rotor blades upstream of the port as projected onto a line parallel to an axial axis. In other words, the chord is an axial length of an upstream rotor blade tip projected onto the axis of rotation.

The term "stroke" refers to a rotation angle of the door when the door moves from the closed position to the open position as measured counter-clockwise from +z of the meridional plane.

The term "exit flow angle" refers to an airflow bend angle of air exiting the port as measured counter-clockwise from +z of the meridional plane. In some examples, the exit flow angle corresponds to a shape of the port.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow a through a turbine section, causing rotating blades of one or more turbines to spin. The rotating blades of the turbine produce a spool work output that powers a corresponding compressor. The spool is a combination of the compressor, a shaft, and the turbine. Turbine engines often include multiple spools, such as a high pressure spool (e.g., HP compressor, shaft, and turbine) and a low pressure spool (e.g., LP compressor, shaft, and turbine). However, a turbine engine can include one spool or more than two spools in additional or alternative examples.

During low speed operation of the turbine engine (e.g., during start-up and/or stopping), equilibrium of the engine is adjusted. In many scenarios, a delay is needed for the spool(s) to adapt (e.g., a time for a rotational speed to adjust for a new equilibrium). However, the compressor cannot stop producing pressurized air for fuel combustion during operation. Such a result may cause the turbine to stop producing the power to turn the compressor, causing the compressor itself to stop compressing air. Accordingly, throttling changes may lead to compressor instabilities, such as compressor stall and/or compressor surge. Compressor stall is a circumstance of abnormal airflow resulting from the aerodynamic stall of rotor blades within the compressor. Compressor stall causes the air flowing through the compressor to slow down or stagnate. $In some cases, the disruption of air flow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor to increase efficiency and limit possible stalls. Example VBV assemblies often include a VBV port (e.g., opening, duct, air bleed slot, etc.) in a compressor casing that opens via actuation of a VBV door. In other words, the VBV is configured as a door that opens to provide a bleed flowpath to bleed off compressed air between a booster (e.g., a low pressure compressor) and a core engine compressor of a gas turbine. For example, the VBV door may be actuated during a speed-speed mismatch between the LP spool and the HP spool. During start-up or stopping, the HP spool may spin at a lower speed than the LP spool. Opening the VBV port allows the LP spool to maintain its speed while reducing the amount of air that is flowing through the axial compressor by directing some of the air flow to the turbine exhaust area. Thus, the VBV door enables the LP spool (e.g., booster) to operate on a lower operating line and further away from a potential instability or stall condition.

A VBV assembly can include a number of components, can use different types of components to actuate the VBV (e.g., to bleed off compressed air), can conceivably orient components in a variety of manners, etc. Consequently, the VBV assemblies can, at least in theory, occupy varying amounts of space within an engine packaging, depending on the design of the specific VBV assembly. But in practice VBV assemblies produce various degrees of effectiveness. For example, a conventional VBV design practice has provided for a VBV door that is not flush with the compressor casing when the VBV is in a closed position, resulting in a bleed cavity that is open to a main flow path within the compressor. The bleed cavity can cause aerodynamic performance losses in the main flow path and/or flow induced cavity oscillations, which can lead to mechanical failure.

As disclosed herein, an effectiveness of a VBV assembly reflects the specific VBV assembly's ability to positively affect an efficiency of the turbine engine, to limit compressor stalls and/or surges, and to limit acoustic resonance caused by a bleed cavity. As engine packaging constraints in the turbine engine industry become smaller, a VBV assembly for a turbine engine needs to be effective while occupying a limited amount of space. For example, a VBV assembly may need to include a minimized axial length while retaining an effective VBV design.

The inventors of the present disclosure have found that limiting certain spatial aspects of a VBV assembly can increase an effectiveness of the VBV while remaining within limiting engine packaging constraints. The inventors' proceeded to design various VBV assemblies with differing bleed cavity areas, different actuation methods and components, occupying different axial lengths within a turbine engine, etc. while determining an effectiveness of each designed VBV assembly. In the course of designing the various VBV assemblies, the inventors discovered that a relationship between an axial length expression representing an axial length that a VBV assembly occupies (e.g., within a turbine engine) and an (in)effectiveness of the VBV assembly can be established that results in a VBV assembly that is axially compact while maintaining a certain level of effectiveness of the VBV. The inventors discovered that applying the relationship to design of a VBV assembly can improve aerodynamic performance and/or efficiency of a turbine engine.

The disclosed relationship eliminates non-compact VBV assembly designs to conform to engine packaging constraint issues. While a larger axially length of a VBV assembly corresponds to an increased effectiveness, engine packaging constraints are becoming smaller. The disclosed relationship limits an axial length of a VBV assembly while maintaining a higher level of effectiveness. An effective VBV design defined by the disclosed relationship will at least include a limited stroke value, a limited exit flow angle (e.g., airflow bend angle), and a limited bleed cavity area when the VBV is in a closed position.

Example VBV assemblies are disclosed below that demonstrate the relationship discovered by the inventors of the present disclosure. Example VBV assemblies as disclosed herein include a VBV port defining an exit flow angle of bleed air and a VBV door having a rotation angle when moving between an open position and a closed position. A larger VBV exit flow angle causes the airflow to turn at a larger angle before exiting the VBV port, which can introduce losses (e.g., pressure losses, etc.) in the flow and decrease an effectiveness of the turbine engine. Thus, certain examples limit a VBV exit flow angle. The rotation angle is a rotation angle as measured when the VBV door moves from the closed position to the open position. Certain examples limit a VBV door rotation angle (e.g., VBV stroke) when moving between a closed position and an open positioned.

Certain preferred VBV assemblies disclosed herein are axially compact with minimal bleed cavity area. In some examples, the VBV assembly includes a VBV door having a surface that is flush with a casing wall when the VBV door is in a closed position (e.g., to limit or otherwise eliminate a bleed cavity area when the VBV is in a closed position). As noted above, a bleed cavity disrupts the mainstream flow path, thus reducing an effectiveness of the VBV. By limiting an area of the bleed cavity, certain examples minimize or otherwise reduce aero-acoustic excitations in the bleed cavity and increase an overall effectiveness of the VBV assembly.

Examples disclosed herein enable manufacture of a variety of VBV assemblies that occupy a limited amount of space within the turbine engine while maintaining a suitable level of effectiveness. In some examples, a VBV assembly includes a sliding door to move the VBV between a closed and open position. In some examples, a hinged door is used to move a VBV between the closed and open position. For example, the hinged VBV door can pivot about a point to open and/or close the VBV. In some examples, the sliding door assembly occupies more axial space in the turbine engine than a hinged door assembly. Certain examples enable partial actuation of a VBV door (e.g., the VBV door opens and/or closes partially). Certain examples include a unison ring (e.g., actuation ring, bleed ring, etc.) that is utilized to actuate a plurality of VBV doors (e.g., blocker doors) concurrently. In some examples, a plurality of unison rings are utilized, enabling a sub-set of VBV doors to actuate concurrently.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference, which corresponds to the axis of rotation z. FIG. 1 also includes an annotated directional diagram with reference to the axis of rotation z and an axial direction A, the radial axis r and a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where the air 158 mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

FIGS. 2A and 2B illustrate partial cross-sectional views of portions of compressor 200 parts of a turbine engine (e.g., turbofan engine 110 of FIG. 1), including an example LP compressor or booster (e.g., LP compressor 122 in FIG. 1) stage 202 and HP compressor stage 204 (e.g., HP compressor 124 in FIG. 1). FIG. 2 includes an annotated diagram of the meridional plane that includes the axis of rotation z and the radial axis r at a constant polar angle. As disclosed herein, a positive direction on the z axis refers to a downstream direction. FIGS. 2A-2B illustrate the compressor 200 at a transition point 206 between the booster stage 202 and the HP compressor stage 204. The compressor 200 includes a casing 208, which defines a mainstream flowpath 210 (e.g., a first flowpath, primary flowpath, etc.) for airflow through the compressor 200 (e.g., and the turbofan engine 110). In the illustrated example of FIGS. 2A-2B, the casing 208 surrounds the booster stage 202 and the HP compressor stage 204. In additional or alternative examples, the booster stage 202 and the HP compressor stage 204 can have distinct casings 208 connected via a linkage mechanism.

The turbine engine 110 includes a VBV assembly 212 that defines a variable bleed valve at the transition point 206 between the booster stage 202 and the HP compressor 204. FIG. 2A illustrates the VBV assembly 212 in an open positioned while FIG. 2B illustrates the VBV assembly 212 in a closed position. The VBV assembly 212 includes a VBV port (e.g., passage, opening, duct, etc.) 214 that defines an example bleed flowpath (e.g., secondary flowpath) 216. The VBV port 214 extends from the inner surface of the casing 208 to the outer surface of the casing 208. While one VBV port 214 is depicted in the illustrated examples of FIGS. 2A-2B, the casing 208 may include one or more VBV ports 214. For example, the casing 208 may include between 8 and 18 VBV ports 214. In some examples, the number of VBV ports 214 integrated into the casing 208 may correspond to a strut count of the turbofan engine 110. The VBV port(s) 214 can be integrated into the casing 208 by a subtractive manufacturing process (e.g., machining, etching, laser cutting, etc.) and/or by an additive manufacturing process.

The bleed flowpath 216 includes an example VBV port exit 218 through which bleed air exits the VBV port 214. FIG. 2A illustrates an example VBV exit flow angle (e.g., $\beta_{exit}$) 220, which is an angle taken by bleed airflow as it exits the VBV port 214, as measured relative to the +z axis. The VBV exit flow angle 220 characterizes the mean flow direction at the VBV port exit 218. It also describes the orientation of the exit 218. The VBV exit flow angle 220 and exit 218 orientation are measured as a positive angle counter-clockwise about the +theta axis (i.e., axis normal to the meridional plane depicted in FIG. 2A). In the illustrated example the angle 220 is 90 degrees. The VBV exit flow angle 220 for fluid flow may be inferred from the shape (e.g., dimensioning, curvature, etc.) of the VBV port 214.

The compressor casing 208 surrounds an array(s) of rotor blades 222 and an array(s) of stator vanes 223 of the compressor 200. In operation, the rotor blades 222 spin, impelling air downstream. An example upstream rotor blade(s) 224 is positioned forward of the VBV port 214. The upstream rotor blade(s) 224 includes an example axial chord, C (e.g., blade-row axial chord) 226, measured at a tip of the upstream rotor blade(s) 224. The axial chord 226 is a length of a projection of the tip of the upstream rotor blade 224 onto a line parallel to the axis of rotation z. In other words, the axial chord 226 is an axial length of the upstream rotor blade 224 tip projected onto the axis of rotation z.

The VBV assembly 212 of FIGS. 2A-2B includes a VBV door 228 located at the VBV port exit 218. In the closed position, the VBV door 228 covers the VBV port exit 218 to prevent air from bleeding from the VBV port 214 (e.g., via the VBV port exit 218). As illustrated in FIG. 2B, such an assembly results in an example bleed cavity 230 when the VBV is in a closed position, which can disrupt the airflow through the mainstream flowpath 210. For example, the bleed cavity 230 may cause acoustic resonance that can lead to compressor instabilities. The bleed cavity 230 includes a bleed area (e.g., BA) 230a, which is a cross-sectional area of the bleed cavity 230 in the meridional plane when VBV assembly 212 is in the closed position. The bleed cavity area 230a is measured from an entrance 231 of the VBV port 214 (and the bleed flowpath 216) to the VBV port exit 218. In examples in which the VBV door 228 is flush with the casing 208 in the closed position (e.g., not illustrated in FIGS. 2A-2B; discussed with reference to FIGS. 7A, 8A, and 9A), the bleed cavity area 230a is substantially zero.

As illustrated in FIG. 2A, certain examples disclosed herein include an example VBV door gap 232 that allows a VBV door (e.g., VBV door 228) to slide in and out between the open position and the closed position to eliminate or otherwise reduce a volume of the bleed cavity 230. For example, the VBV door gap 232 may allow the VBV door 228 to remain flush with the casing 208 in the closed position, thus eliminating and/or limiting the impacts of the bleed cavity 230 on the mainstream flowpath 210.

In the example of FIGS. 2A-2B, the VBV door 228 moves from the open position of FIG. 2A to the closed position of FIG. 2B via an actuator (e.g., not illustrated in FIGS. 2A-2B), which can be e.g., a linear actuator, a lead screw, hydraulic actuator. The VBV assembly 212 includes an example VBV stroke (e.g., AO) 234, which is a rotation angle of the VBV door 228 when the VBV door 228 moves from the closed position to the open position. The VBV stroke, AO, 234 is measured as a positive angle counter-clockwise from the +z axis of rotation of the meridional plane. The VBV door 228 of FIGS. 2A-2B slides between the open position and the closed position. Thus, the VBV stroke, AO, 234 of the VBV assembly 212 of FIGS. 2A-2B is substantially zero.

FIG. 2B illustrates an example axial port length (e.g., LA) 236 of the bleed assembly 212. The axial port length, LA, 236 is an axial length of the VBV port 214 measured from a forward (e.g., entrance) lip 238 of the VBV port 214 to an aft (e.g., exit) lip 240 of the VBV port 214. In some examples, the exit lip 240 is an aft exit wall 240. Certain examples include an example axial actuation length (e.g., $LA_{act}$) 242, which refers to an axial length needed for actuation (e.g., full actuation, partial actuation, etc.) of the VBV door 228 to bleed air for the VBV port 214. In other words, the axial actuation length 242 is an axial distance the VBV door 228 translates forward of the entrance lip 238 or aft of the exit lip 240 to open the VBV port 214 to bleed air from the booster stage 202. The VBV assembly 212 of FIGS. 2A-2B does not need axial space beyond the axial port length LA, 236 of the bleed assembly 212 for actuation of the VBV door 228. Thus, the axial actuation length $LA_{act}$ 242 of FIGS. 2A-2B is substantially zero.

In some examples, the VBV assembly 212 includes a controller (not shown). The controller may be structured to monitor the compressor 200 to identify a speed-speed mismatch between the booster stage 202 and the HP compressor stage 204. For example, the controller may identify a mismatch between a spool of the booster stage 202 and a spool of the HP compressor stage 204. The controller may be a human and/or monitoring circuitry controlled by an electronic compute device such as a computer. In response to identifying the speed-speed mismatch, the controller may be structured to actuate the VBV assembly 212. For example, the controller may cause an actuator to move the VBV assembly 212 between a closed position and an open position to allow air to bleed from the booster stage 202 (e.g., via the VBV ports 214). The controller may be structured to cause the actuator to move the VBV assembly 212 from the open position to the closed position to stop air from bleeding from the booster stage 202.

As discussed above, the inventors sought a VBV assembly that could provide the desired compactness (reduced axial length and volume) while not adversely affecting aerodynamic efficiency in the compressor, and preferably improving upon prior designs. During the course of experimentation, field assessments of VBV valves (aerodynamic performance, acoustics etc. and empirical tests, it was unexpectedly discovered that there exists a relationship between a characteristic axial length associated with the VBV, a bleed cavity area (BA) and the VBV exit flow angle. It was found that by operating within a defined range using a relationship influenced by the BA, the exit flow angle and other, related variables associated with the VBV (as defined below), an improved VBV assembly is found, for one or both of meeting aerodynamic performance requirements and fitting a VBV assembly within a reduced axial length. The discovered relationships will now be explained in greater detail.

Figure 3:
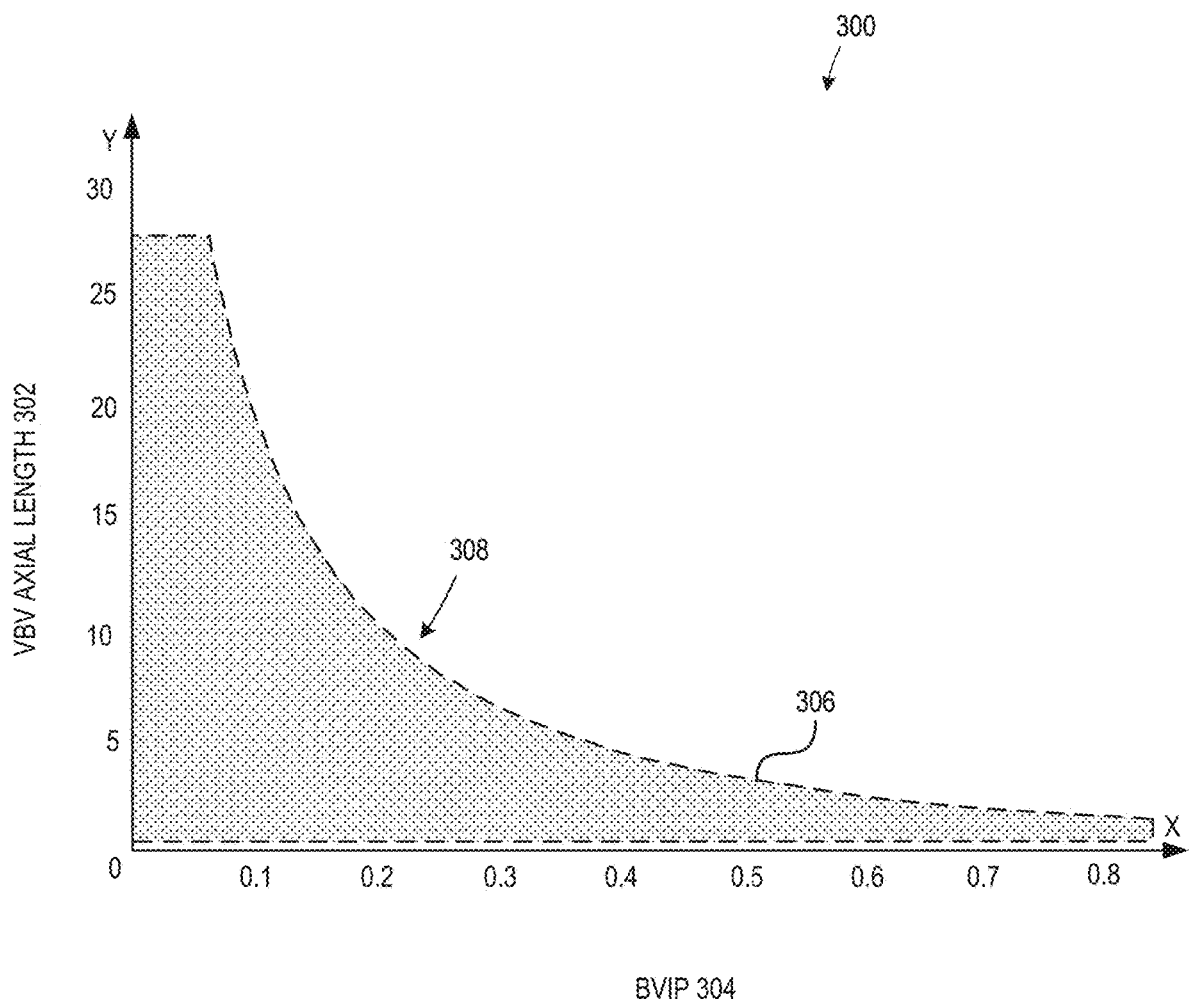
FIG. 3 is a graph, including an effectiveness curve, that illustrates a relationship between a variable bleed valve axial length and a Bleed Valve Ineffectiveness Parameter (BVIP).

FIG. 3 shows a graph 300 that relates a VBV axial length 302 (e.g., Y-axis) and a Bleed Valve Ineffectiveness Parameter (BVIP) 304 (e.g., X-axis). The shaded area represents a relationship between an axial length of space within a turbine engine occupied by a VBV assembly (e.g., VBV assembly 212 of FIGS. 2A-2B, VBV assemblies discussed below, and/or other VBV assemblies enabled by examples disclosed herein) and an (in)effectiveness of the VBV assembly 212 that was unexpectedly discovered by the inventors during the course of VBV assembly design (e.g., designing VBV assemblies that occupy limited axial space within a turbine engine while maintaining a proper level of effectiveness). The inventors discovered that as engine packaging constraints become smaller, the axial length of the VBV assembly 212 can be reduced significantly while retaining an effective VBV design by designing the VBV according to the discovered relationship.

The Y-axis of the graph 300 representing the VBV axial length 302 is non-dimensional, representing a relationship between an axial port length, LA, (e.g., axial port length 236 of the bleed assembly 212 of FIGS. 2A-2B), an axial actuation length, $LA_{act}$, (e.g., axial actuation length 242 of the bleed assembly 212 of FIGS. 2A-2B), and an axial chord, C, (e.g., axial chord 226 of FIGS. 2A-2B) as measured at the tip of the upstream rotor blade nearest the VBV (e.g., blade 224). Specifically, the VBV axial length is expressed as:

$$\frac{LA + LA_{act}}{C}. \quad (1)$$

The X-axis of the graph 300 representing the BVIP 304 corresponds to a measure of how ineffective a particular VBV assembly is in operation. A lower BVIP 304 value corresponds to a higher effectiveness and a high BVIP 304 value corresponds to a lower effectiveness. A more effective VBV assembly is closer to the Y-axis because effectiveness decreases along the positive Y-axis (and increases in ineffectiveness along the positive Y-axis). The BVIP 304 represents a relationship between a bleed cavity area, BA, (e.g., bleed cavity area 230a) of a bleed cavity (e.g., bleed cavity 230), the axial chord, C, 226, a VBV stroke, $\Delta\theta$, (e.g., VBV stroke 234) (e.g., in radians), and a VBV exit flow angle, $\beta_{exit}$, (e.g., VBV exit flow angle 220) (e.g., in radians). Specifically, the BVIP 304 is expressed as:

$$BVIP = 0.15 * \frac{BA}{C^2} + 0.85 * \frac{\Delta\theta + \beta_{exit}}{2\pi}. \quad (2)$$

The graph 300 of FIG. 3 identifies a VBV effectiveness curve 306. The VBV effectiveness curve 306 of FIG. 3 is expressed as follows:

$$\frac{LA + LA_{act}}{C} - 2*(BVIP + 0.15)^{-1.35} \le -0.8. \quad (3)$$

As indicated in the graph 300, a more effective VBV assembly 212 tends to be larger axially. However, real-world applications and preferences can limit a possible size of the VBV assembly 212. As engine packaging constraints become smaller, ideal or otherwise effective VBV assemblies will lie in a design space region 308 below the VBV effectiveness curve 306. The design space region 308 where desirable designs lie is bound in the Y-axis by $$0.465 \le \frac{LA + LA_{act}}{C} \le 27.9.$$

The design space region 308 is bound in the X-axis by 0≤BVIP≤0.830. It is believed that an effective VBV assembly can be designed and/or constructed to minimize or otherwise limit the BVIP 304 while remaining below an axial length given by the VBV effectiveness curve 306, to arrive at an improved VBV assembly that properly accounts for space limitations without unacceptably adversely impacting aerodynamic efficiency.

As noted above and illustrated in FIG. 3, a smaller BVIP 304 value corresponds to a higher effectiveness. An effective VBV by this definition will have a small or otherwise eliminated bleed area, BA, 230a. The reduced bleed area, BA, 230a can limit the BVIP 304 value, resulting in an increased effectiveness (or decreased ineffectiveness) of the VBV assembly 212. A VBV assembly having a larger bleed area, BA, 230a affects the BVIP 304 in a manner that increases the BVIP 304 value, resulting in a higher ineffectiveness.

Expression (3) similarly calls for reducing or limiting the VBV stroke, $\Delta\theta$, 234 and the VBV exit angle $\beta_{exit}$ 220 to reduce the BVIP 304 value of the VBV assembly 212. Limiting the VBV exit angle $\beta_{exit}$ 220 can also minimize or otherwise reduce a pressure (e.g., total pressure, Pt) loss when the VBV assembly 212 is in the open position. Accordingly, an effective VBV assembly can be designed and/or constructed by adhering to a design space defined by Expression (3).

Based on the foregoing, variables to consider when designing a VBV assembly include $$\frac{LA}{C}, \frac{LA_{act}}{C}, \frac{BA}{C^2}, \Delta\theta, \text{ and } \beta_{exit}.$$

In some examples, the non-dimensional variable $$\frac{BA}{C^2}$$

can be reduced to limit acoustic resonance issues in the bleed cavity 230 of the VBV port 214 when the VBV assembly 212 is in the closed position. In some examples, the VBV stroke, $\Delta\theta$, 234 should remain as low as possible to limit the BVIP 304 value. In some examples, the VBV exit flow angle, $\beta_{exit}$, 220 should remain low to minimize pressure loss. An effective VBV assembly having a limited axial length includes variables that are within a range(s) as defined in Table 1, below.

TABLE 1:

| Non-Dimensional Parametric Variable Ranges | |
|---|---|
| Variable | Range |
| $\frac{LA}{C}$ (non-dimensional) | $0.92 < \frac{LA}{C} \le 27.9$ |
| $\frac{LA_{act}}{C}$ (non-dimensional) | $0 \le \frac{LA_{act}}{C} \le 2$ |
| $\frac{BA}{C^2}$ (non-dimensional) | $0 \le \frac{BA}{C^2} \le 5.0$ |
| $\frac{\Delta\theta}{2\pi}$ (non-dimensional) | $-0.25 \le \frac{\Delta\theta}{2\pi} \le 0.25$ |
| $\frac{\beta_{exit}}{2\pi}$ (non-dimensional) | $-0.375 \le \frac{\beta_{exit}}{2\pi} \le 0.375$ |

Various example VBV assemblies that fall within these ranges and adhering to expression (3) are described below. The embodiments are described in terms of an axial chord, C, 226, the axial port length, LA, 236, the axial actuation length, $LA_{act}$, 242, the bleed cavity area, BA, 230A, the VBV stroke, $\Delta\theta$, 234, and the VBV exit angle, $\beta_{exit}$, 220, and satisfying the expression (3), as defined within the X and Y axis limits (FIG. 3).

Examples disclosed below are disclosed in the context of the compressor 200 portions depicted in FIGS. 2A and 2B. Accordingly, following examples include the example casing 208, which defines a mainstream flowpath 210, and VBV port(s) 214, and bleed flowpath 216. It is understood that examples disclosed herein taken with the principles set forth above may be adapted and readily applied in connection with one or more compressors, such as a high pressure compressor, a low pressure compressor, etc. Examples disclosed herein may be implemented on a compressor having a variety of configurations, such as including one or more VBV ports, compressor stages, etc. Further, examples disclosed herein may be applied to a variety of turbine engines, such as a multi-spool turbine engine, a turboshaft engine, turbine engines with one compressor section, etc.

FIGS. 4A and 4B illustrate an example VBV assembly 400 structured in accordance with the teachings of this disclosure. The VBV assembly 400 is positioned radially outward from the casing 208, which includes one or more VBV ports 214. The casing 208 surrounds at least an upstream rotor blade 224 having an axial chord, C, 226. The VBV assembly 400 includes at least one VBV door 228 coupled to a unison ring 402 (e.g., actuation ring). The VBV door(s) 228 is structured to cover the VBV port(s) 214 in a closed position. The VBV door 228 of FIGS. 4A-4B is also structured as a wall of the VBV port 214 when the VBV assembly 400 is in an open position. The unison ring 402 is structured to move the VBV doors 228 between a first position and a second position to uncover the VBV port(s) 214, allowing air to bleed from the booster stage 202. One or more VBV doors 228 may be included. For example, the quantity of VBV doors 228 may correspond to the quantity of VBV ports 214 (e.g., from 8 to 24 VBV doors). In some examples, multiple VBV ports 214 may share a VBV door 228. Accordingly, certain examples have a different quantity of VBV doors 228 than VBV ports 214. In some examples, the unison ring 402 is operatively coupled to an example actuator 404 (e.g., via an example actuator rod 406). The actuator 404 may be a linear actuator, hydraulic actuator, pneumatic actuator, power screw, etc.

The unison ring 402 is coupled to a connection arm 408, which is operatively coupled to the example actuator 404 via the actuator rod 406. In operation, the actuator 404 moves between a first position (e.g., a closed position of FIG. 4A) and a second position (e.g., an open position of FIG. 4B). In the illustrated example of FIGS. 4A and 4B, the actuator 404 moves in an axial direction. However, the actuator 404 may be configured to move in one or more other direction(s) capable of causing the VBV assembly 400 to open and/or close the VBV port 214. The movement of the actuator 404 from the first position to the second position causes the unison ring 402 to move from the first position to the second position (e.g., via the actuator rod 406 and the connection arm 408). The movement of the unison ring 402 from the first position to the second position causes the VBV door 228 to slide from the first (closed) position to the second (open) position. Because the VBV door 228 slides between the first (closed) position to the second (open) position, an example VBV stroke, $\Delta\theta$, 234 (e.g., a rotation angle of the VBV door 228) of the VBV assembly 400 is substantially zero. That is, the sliding action of the VBV door 228 from the closed position to the open position does not involve rotational movement with a rotation angle defined by the VBV stroke, $\Delta\theta$, 234.

To move the VBV assembly 400 to the first position, the actuator 404 moves from the second position to the first position, which causes the unison ring 402 to move from the second position to the first position. The movement of the unison ring 402 from the second position to the first position causes the VBV door 228 to slide towards the first (closed) position.

As illustrated in FIG. 4A, the VBV port 214 includes an axial port length, LA, 236. In the closed position of FIG. 4A, the VBV door 228 is positioned in the VBV port 214 to form a bleed cavity 230 having a bleed cavity area, BA, 230a. However, the VBV door 228 provides an approximately 80% reduction in bleed cavity area, BA, 230a as compared to the VBV assembly 212 of FIGS. 2A-2B.

As illustrated in FIG. 4B, the VBV assembly 400 includes an axial actuation length, $LA_{act}$, 242. FIG. 4B also illustrates a VBV axial length (e.g., $LA+LA_{act}$) 410, which defines a VBV axial length that includes the axial port length, LA, 236 and the axial actuation length, $LA_{act}$, 242. The VBV assembly 400 also includes a VBV exit angle, $\beta_{exit}$, 220.

The VBV assembly 400 of FIGS. 4A and 4B can be configured in a variety of arrangements. In some examples, the unison ring 402 operatively and circumferentially links a plurality of VBV doors 228. In such examples, at least one actuator 404 causes the single unison ring 402 to move the VBV doors 228 of the VBV assembly 400 concurrently. In some examples, the VBV assembly 400 includes more than one unison ring 402, each unison ring 402 having a corresponding actuator 404. In such examples, each unison ring 402 may operatively and circumferentially link a plurality of VBV doors 228. In other words, some examples enable a subset of VBV door 228 to be linked and actuated via distinct unison rings 402.

Additional and/or alternative example VBV assemblies and/or configurations are disclosed below. The example VBV assemblies disclosed below are similar to the VBV assembly 400 of FIGS. 4A and 4B. As such, the details of the parts (e.g., casing 208, VBV port(s) 214, VBV door(s) 228, unison ring(s) 402, example actuator(s) 404, VBV axial length 410, etc.) are not repeated in connection with FIGS. 5A-9. Further, the same reference numbers used for the structures shown in FIGS. 2-4B are used for similar or identical structures in FIGS. 5A-9.

FIGS. 5A-5B illustrate another VBV assembly 500 structured in accordance with the teachings of this disclosure. The VBV assembly 500 of FIGS. 5A-5B is similar to the VBV assembly 400 of FIGS. 4A-4B. However, the VBV assembly 500 of FIGS. 5A-5B includes a VBV door 228 that is smaller than the VBV door 228 of the VBV assembly 400 of FIGS. 4A-4B. As a result, the VBV door 228 in the illustrated example of FIG. 5A includes a bleed cavity 230 having a bleed cavity area, BA, 230a that is larger than the bleed cavity area, BA, 230a of FIG. 4A. For example, the VBV door 228 of FIG. 5A provides an approximately 50% reduction in bleed cavity area, BA, 230a as compared to the VBV assembly 212 of FIGS. 2A-2B (e.g., as compared to the approximately 80% reduction provided by the VBV door 228 of FIG. 4A). Such an increase in the bleed cavity area, BA, 230a can result in the VBV assembly 500 having a higher BVIP 304 value (e.g., as compared to a BVIP 304 value of the VBV assembly 400 of FIGS. 4A-4B).

In operation, the VBV assembly 500 of FIGS. 5A-5B operates in the same or similar manner as the VBV assembly 400 of FIGS. 4A-4B. For example, an actuator 404 is coupled to a unison ring 402 (e.g., via an actuator rod 406 and a connection arm 408). In operation, the actuator 404 moves between a first position (e.g., a closed position of FIG. 4A) and a second position (e.g., an open position of FIG. 4B), which causes the unison ring 402 to move from the first position to the second position (e.g., via the actuator rod 406 and the connection arm 408). The movement of the unison ring 402 from the first position to the second position causes the VBV door 228 to slide from the first (closed) position to the second (open) position. Because the VBV door 228 slides between the first (closed) position to the second (open) position, a VBV stroke, $\Delta\theta$ 234 of the VBV assembly 500 is substantially zero.

As illustrated in FIG. 5A, the VBV port 214 includes an axial port length, LA, 236. As illustrated in FIG. 5B, the VBV assembly 500 includes an axial actuation length, $LA_{act}$, 242 and a VBV axial length (e.g., $LA+LA_{act}$) 410. The VBV assembly 500 also includes a VBV exit angle, $\beta_{exit}$ 220.

Figure 6:
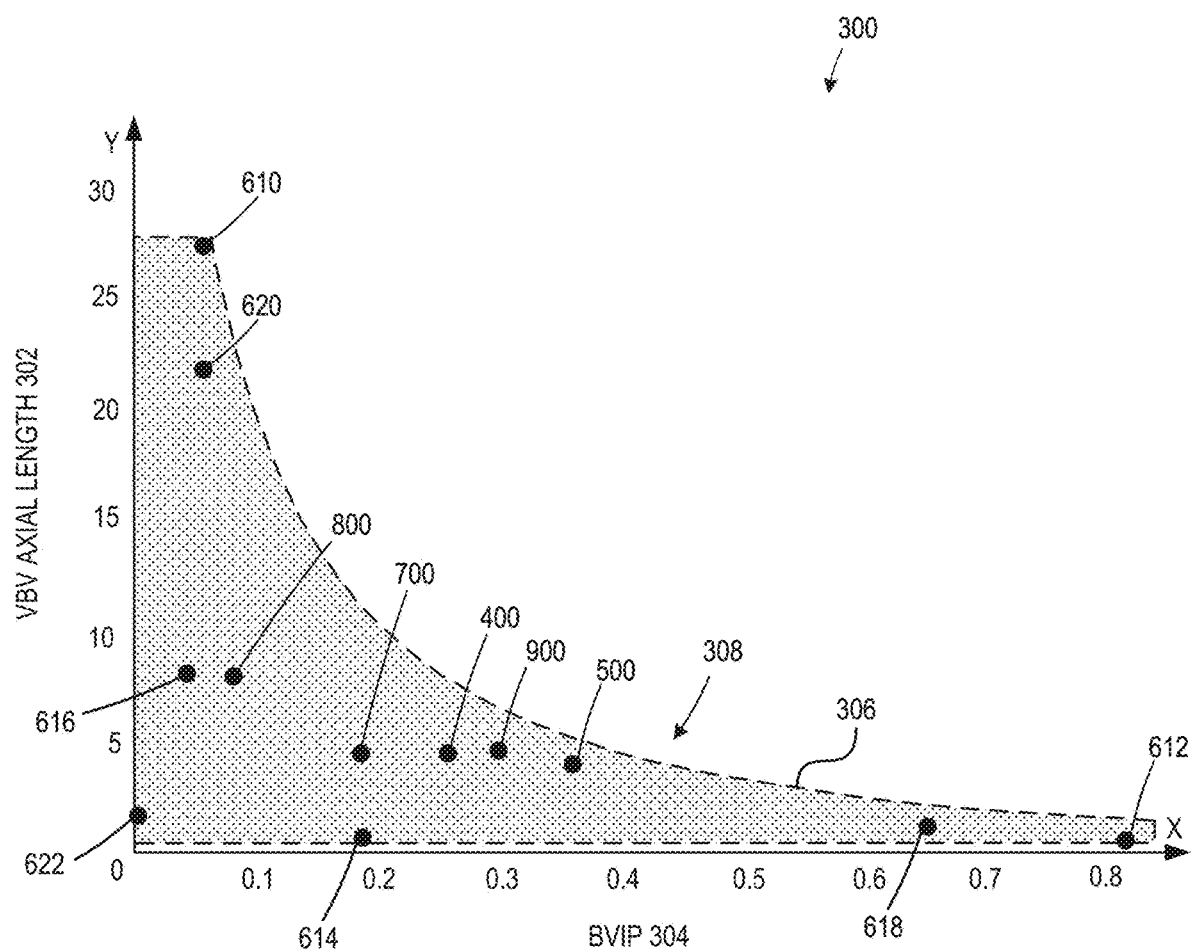
FIG. 6 illustrates the graph of FIG. 3, including data points corresponding to certain example variable bleed valve assemblies structured in accordance with the teachings of this disclosure.

FIG. 6 illustrates the graph 300 of FIG. 3, including the VBV effectiveness curve 306. The graph 300 of FIG. 6 includes data points indicating a placement of example VBV assemblies disclosed herein in the design space region 308 below the VBV effectiveness curve 306. As illustrated in FIG. 6, the VBV assembly 400 of FIGS. 4A-4B and the VBV assembly 500 of FIGS. 5A-5B have similar Y-axis values. That is, the VBV assemblies 400, 500 include similar VBV axial length 302 value. However, the VBV assembly 500 of FIGS. 5A-5B is positioned further along on the X-axis than the VBV assembly 400 of FIGS. 4A-4B. That is, the VBV assembly 500 of FIGS. 5A-5B is more ineffective (e.g., less effective) than the VBV assembly 400 of FIGS. 4A-4B. A reason for the difference in levels of effectiveness between the VBV assemblies 400, 500 can include the differing bleed cavity areas, BA, 230*a*, for example. For example, the larger bleed cavity area 230*a* of the VBV assembly 500 increased an ineffectiveness of the VBV assembly 500.

FIGS. 7A and 7B illustrate another example VBV assembly 700 structured in accordance with the teachings of this disclosure. The VBV assembly 700 includes at least one VBV door 228, at least one VBV door gap 232, and an actuator 404. The casing 208 includes at least one VBV port 214 that defines a bleed flowpath 216. The casing 208 surrounds an upstream rotor blade 224 having an axial chord, C, 226. The VBV assembly 700 includes an example pin-and-slot 702, which includes an example slider pin 704 and an example slot 706. The slider pin 704 rests within the slot 706 but is not coupled to the slot 706. The slot 706 is coupled to the turbofan engine 110. In the illustrated example of FIGS. 7A and 7B, the pin-and-slot 702 is positioned radially outward from the casing 208 and upstream of the VBV port 214.

An upstream end of the VBV door 228 is operatively coupled to the pin-and-slot 702 via the slider pin 704. The example pin-and-slot 702 is connected to an actuator 404 such that the pin-and-slot 702 can move back-and-forth in an axial direction (e.g., upstream and downstream). In the illustrated example of FIGS. 7A and 7B, the pin-and-slot 702 is operatively coupled to a unison ring 402, which is operatively coupled to an actuator 404 via an actuator rod 406. In operation, the actuator 404 moves between a first position (e.g., a closed position of FIG. 7A) and a second position (e.g., an open position of FIG. 7B). The movement of the actuator 404 from the first position to the second position causes the unison ring 402 to move from the first position to the second position in the axial direction. The movement of the unison ring 402 from the first position to the second position causes the slot 706 to move from the first position to the second position in the axial direction, which causes the slider pin 704 to slide up the slot 706. The movement of the slider pin 704 sliding up the slot 706 causes the VBV door 228 to follow a radially-outward/axially-upstream direction out of the VBV door gap 232 and towards the second (e.g., open) position. In other words, the movement of the unison ring 402 causes the pin-and-slot 702 to pull the VBV door 228 out of the VBV door gap 232. As the VBV door 228 slides out of the VBV door gap 232, the VBV door 228 retains a substantially same orientation angle. As such, a VBV stroke, Δθ 234 (e.g., the rotation angle of the VBV door 228) of the VBV assembly 700 is substantially zero.

To move the VBV assembly 700 to the first position, the actuator 404 moves from the second position to the first position, which causes the unison ring 402 to move from the second position to the first position. The movement of the unison ring 402 from the second position to the first position causes the slot 706 to move from the second position to the first position causing the slider pin 704 to slide down the slot 706. A resultant pushing force on the VBV door 228 causes the VBV door 228 to slide into the VBV door gap 232 towards the first (closed) position. The VBV door 228 slides between the first (closed) position to the second (open) position, and vice versa.

As illustrated in FIG. 7A, the VBV port 214 includes an axial port length, LA, 236. In the closed position of FIG. 7A, the VBV door 228 enters the VBV port 214 via the VBV door gap 232. The VBV door gap 232 enables the VBV door 228 to be positioned in the VBV port 214 such that the VBV door 228 is substantially flush with the casing 208. As such, the VBV assembly 700 eliminates or otherwise reduces a bleed cavity 230 resulting in little to no example bleed cavity area, BA, 230*a*.

As illustrated in FIG. 7B, the VBV assembly 700 includes an axial actuation length, $LA_{act}$, 242, and a VBV axial length (e.g., $LA+LA_{act}$) 410. The VBV assembly 700 also includes a VBV exit angle, $\beta_{exit}$ 220.

The VBV assembly 700 of FIGS. 7A and 7B can be configured in a variety of arrangements. In some examples, a different pin-and-slot mechanism is utilized, which may rely on differing forces and angles. In some examples, the unison ring 402 operatively and circumferentially links every pin-and-slot 702 (and corresponding VBV door 228). In such examples, at least one actuator 404 may cause the single unison ring 402 to move every VBV door 228 of the VBV assembly 700 concurrently. In some examples, the VBV assembly 700 includes more than one unison ring 402, each unison ring 402 having a corresponding actuator 404. In such examples, each unison ring 402 may operatively and circumferentially link a plurality of pin-and-slots 702 (and corresponding VBV doors 228). In other words, some examples enable a subset of pin-and-slots 702 and corresponding VBV doors 228 to be linked and actuated via distinct unison rings 402. In some examples, the VBV assembly 700 does not include a unison ring 402. In such examples, each pin-and-slot 702 is operatively coupled to a corresponding actuator 404, which pushes and/or pulls the slot 706 to cause the slider pin 704 to slide up and/or down the slot 706.

Referring again to FIG. 6, the VBV assembly 700 results in an VBV axial length 302 value that is larger than the VBV axial length 302 values of the VBV assemblies 400, 500 of FIGS. 4A-4B and 5A-5B. Further, the VBV assembly 700 results in a BVIP 304 value that is smaller than the VBV assemblies 400, 500 of FIGS. 4A-4B and 5A-5B. As a result, the VBV assembly 700 of FIGS. 7A-7B is more effective (e.g., less ineffective) than the VBV assemblies 400, 500 of FIGS. 4A-4B and 5A-5B. A reason for the increased effectiveness is the increased VBV axial length 302 values caused by the increased VBV axial length (e.g., $LA+LA_{act}$) 410. Another reason for the increased effectiveness is the reduced bleed cavity area, BA, 230*a* of the VBV assembly 700 of FIGS. 7A-7B.

FIGS. 8A and 8B illustrate another example VBV assembly 800 structured in accordance with the teachings of this disclosure. The VBV assembly 800 includes at least one VBV door 228, a unison ring 402, and an actuator 404. The casing 208 includes at least one VBV port 214 that at least partially defines a bleed flowpath 216. The casing 208 surrounds an upstream rotor blade 224 having an axial chord, C, 226. The VBV assembly 800 includes an example hinge 802. In the illustrated example of FIGS. 8A and 8B, the hinge 802 is positioned radially outward from the casing 208 and the VBV port 214.

The hinge 802 is structured to enable the VBV door 228 to rotate about an example hinge point 804. The hinge 802 includes an example stationary leaf 806, which is coupled to the turbofan engine 110 at the bleed flowpath 216, and an example mobile leaf 808 connected at the hinge point 804. That is, the hinge 802 of FIGS. 8A-8B is coupled to the secondary flowpath 216. The hinge point 804 connects the stationary leaf 806 and the mobile leaf 808 such that the mobile leaf 808 can pivot about the hinge point 804. A downstream end of the VBV door 228 is coupled to the mobile leaf 808. In the illustrated example of FIGS. 8A and 8B, the mobile leaf 808 is operatively coupled to the unison ring 402 via an example connection arm 408. The unison ring 402 is operatively coupled to the actuator 404 via example actuator rod 406.

In operation, the actuator 404 moves between a first position (e.g., a closed position of FIG. 8A) and a second position (e.g., an open position of FIG. 8B). The movement of the actuator 404 from the first position to the second position causes the unison ring 402 to move from the first position to the second position. The movement of the unison ring 402 from the first position to the second position pulls the mobile leaf 808 via the example connection arm 408, during which the mobile leaf 808 pivots about the hinge point 804. As the mobile leaf 808 pivots about the hinge point 804, the mobile leaf 808 pulls the VBV door 228 from the first (closed) position to the second (open) position. In other words, the unison ring 402 causes the mobile leaf 808 to pivot about the hinge point 804 which causes a circumferential motion of the VBV door 228. The circumferential motion of the VBV door 228 moves the VBV door 228 from the first (closed) position to the second (open) position. As a result, an example VBV stroke, $\Delta\theta$ 234 (e.g., the rotation angle of the VBV door 228 measured from +z) of the VBV assembly 800 is a negative value.

To move the VBV assembly 800 to the first position, the actuator 404 moves from the second position to the first position, which causes the unison ring 402 to move from the second position to the first position. The movement of the unison ring 402 from the second position to the first position pushes the connection arm 408, which causes the mobile leaf 808 to pivot about the hinge point 804. The motion of the mobile leaf 808 as it pivots about the hinge point 804 causes the VBV door 228 to move in a circumferential motion towards the first (closed) position. In the closed position, the mobile leaf 808 acts as a VBV port 214 wall.

As illustrated in FIG. 8A, the VBV port 214 includes an axial port length, LA, 236. In the closed position of FIG. 8A, the VBV door 228 is positioned at the VBV port 214 such that the VBV door 228 is substantially flush with the casing 208. As such, the VBV assembly 800 eliminates or otherwise reduces a bleed cavity 230 resulting in little to no bleed cavity area, BA, 230a.

As illustrated in FIG. 8B, the VBV assembly 800 includes an axial actuation length, $LA_{act}$, 242 and an axial VBV assembly length (e.g., $LA+LA_{act}$) 410. The VBV assembly 800 also includes a VBV exit angle, $\beta_{exit}$ 220.

The VBV assembly 800 of FIGS. 8A and 8B can be configured in a variety of arrangements. In some examples, the unison ring 402 operatively and circumferentially links every hinge 802 (and corresponding VBV door 228) of the VBV assembly 800. In such examples, a single actuator 404 causes the single unison ring 402 to move every VBV door 228 of the VBV assembly 800 concurrently. In some examples, the VBV assembly 800 includes more than one unison ring 402, each unison ring 402 having a corresponding actuator 404. In such examples, each unison ring 402 may operatively and circumferentially link a plurality of hinges 802 (and corresponding VBV doors 228). In other words, some examples enable a subset of hinges 802 and corresponding VBV doors 228 to be linked and actuated via distinct unison rings 402.

In some examples, the VBV assembly 800 does not include a unison ring 402. In such examples, each hinge 802 is operatively coupled to a corresponding actuator 404, which pushes and/or pulls the mobile leaf 808 about the hinge point 804. In some examples, the hinges 802 are operatively coupled to the actuators 404 via corresponding connection arms 408.

Referring again to FIG. 6, the VBV assembly 800 results in a VBV axial length 302 that is larger than the VBV axial lengths 302 of the VBV assemblies 400, 500, 700 of FIGS. 4A-4B, 5A-5B and 7A-7B, respectively. Further, the VBV assembly 800 results in a BVIP 304 value that is smaller than the VBV assemblies 400, 500, 700 of FIGS. 4A-4B, 5A-5B and 7A-7B, respectively. As a result, the VBV assembly 800 of FIGS. 8A-8B is more effective (e.g., less ineffective) than the VBV assemblies 400, 500, 700 of FIGS. 4A-4B, 5A-5B and 7A-7B, respectively. A reason for the increased effectiveness is the negative VBV stroke 234 of the VBV assembly 800. Another reason for the increased effectiveness is the reduced bleed cavity area, BA, 230a of the VBV assembly 800 of FIGS. 8A-8B.

FIGS. 9A and 9B illustrate another example VBV assembly 900 structured in accordance with the teachings of this disclosure. The VBV assembly 900 includes at least one VBV door 228, a unison ring 402, and an actuator 404. The casing 208 includes at least one VBV port 214 that at least partially defines a bleed flowpath 216. The casing 208 surrounds an upstream rotor blade 224 having an axial chord, C, 226. The VBV assembly 900 includes an example hinge 902, which is similar to the hinge 802 of FIGS. 8A-8B. However, the hinge 902 of FIGS. 9A and 9B is connected to a forward lip 238 of the VBV port 214 as opposed to a station leaf. That is, the hinge 902 of FIGS. 9A-9B is coupled to the mainstream flowpath 210.

The hinge 902 is structured to enable the VBV door 228 to move about a hinge point 904. The hinge 902 is coupled to the turbofan engine 110 at the mainstream flowpath 210 and to an upstream end of the VBV door 228. In the illustrated example of FIGS. 9A and 9B, the VBV door 228 is operatively coupled to the unison ring 402 via an example connection arm 408. The unison ring 402 is operatively coupled to the actuator 404 via example actuator rod 406.

In operation, the actuator 404 moves between a first position (e.g., a closed position of FIG. 9A) and a second position (e.g., an open position of FIG. 9B). The movement of the actuator 404 from the first position to the second position causes the unison ring 402 to move from the first position to the second position. The movement of the unison ring 402 from the first position to the second position pulls VBV door 228 via the connection arm 408, during which the VBV door 228 pivots about the hinge point 904 to move the VBV door 228 from the first (closed) position to the second (open) position. In other words, the unison ring 402 causes the VBV door 228 to move in a circumferential motion about the hinge point 804 to move the VBV door 228 from the first (closed) position to the second (open) position. As a result, an example VBV stroke, $\Delta\theta$ 234 (e.g., the rotation angle of the VBV door 228 measured from +z), of the VBV assembly 900 is a positive value.

To move the VBV assembly 900 to the first position, the actuator 404 moves from the second position to the first position, which causes the unison ring 402 to move from the second position to the first position. The movement of the unison ring 402 from the second position to the first position pushes the connection arm 408, which causes the VBV door 228 to pivot about the hinge point 904 to move in a circumferential motion towards the first (closed) position.

As illustrated in FIG. 9A, the VBV port 214 includes an axial port length, LA, 236. In the closed position of FIG. 9A, the VBV door 228 is positioned at the VBV port 214 to allow the VBV door 228 to be substantially flush with the casing 208. As such, the VBV assembly 900 eliminates or otherwise reduces a bleed cavity 230 resulting in little to no bleed cavity area, BA, 230a. As illustrated in FIG. 9B, the VBV assembly 900 includes an axial actuation length, $LA_{act}$, 242 and an axial VBV assembly length (e.g., $LA+LA_{act}$) 410. The VBV assembly 900 also includes a VBV exit angle, $\beta_{exit}$ 220.

The VBV assembly 900 of FIGS. 9A and 9B can be configured in a variety of arrangements. In some examples, the unison ring 402 operatively and circumferentially links every hinge 902 (and corresponding VBV door 228) of the VBV assembly 900. In such examples, a single actuator 404 causes the single unison ring 402 to move every VBV door 228 of the VBV assembly 900 concurrently. In some examples, the VBV assembly 900 includes more than one unison ring 402, each unison ring 402 having a corresponding actuator 404. In such examples, each unison ring 402 may operatively and circumferentially link a plurality of hinges 902 (and corresponding VBV doors 228). In other words, some examples enable a subset of hinges 902 and corresponding VBV doors 228 to be linked and actuated via distinct unison rings 402. In some examples, the VBV assembly 900 does not include a unison ring 402. In such examples, each hinge 902 is operatively coupled to a corresponding actuator 404, which pushes and/or pulls the VBV door about the hinge point 904. In some examples, the hinges 902 are operatively coupled to the actuators 404 via corresponding connection arms 408.

Referring again to FIG. 6, the VBV assembly 900 results in an VBV axial length 302 that is similar to the VBV axial lengths 302 of the VBV assemblies 400, 500, 700 of FIGS. 4A-4B, 5A-5B and 7A-7B, respectively, but smaller than the hinged VBV assembly 800 of FIGS. 8A-8B. A reason for the lower VBV axial length 302 of the VBV assembly 900 of FIGS. 9A-9B as compared to the VBV assembly 800 of FIGS. 8A-8B is the VBV assembly 900 of FIGS. 9A-9B includes a positive VBV stroke 234, which is larger than the negative VBV stroke 234 of the VBV assembly 800 of FIGS. 8A-8B.

The VBV assembly 900 results in a BVIP 304 value that is smaller than the VBV assemblies 400, 700, 800 of FIGS. 4A-4B, 7A-7B and 8A-8B, respectively. As a result, the VBV assembly 900 of FIGS. 9A-9B is less effective (e.g., more ineffective) than the VBV assemblies 400, 700, 800 of FIGS. 4A-4B, 7A-7B and 8A-8B, respectively. A reason for the decreased effectiveness is that the VBV assembly 900 of FIGS. 9A-9B includes a smaller axial actuation length, $LA_{act}$, 242, limiting the VBV axial length 302.

FIG. 6 shows exemplary values for (1), (2) for embodiments (relative to axial length restraints in various architectures) disclosed with respect to the curve from FIG. 3. BVIP and axial length values shown refer to a first example VBV assembly 610, a second example VBV assembly 612, a third example VBV assembly 614, a fourth example VBV assembly 616, a fifth example VBV assembly 618, a sixth example VBV assembly 620, and a seventh example VBV assembly 622. Table 2, below, illustrates example values corresponding to the VBV assemblies disclosed herein. It is understood that the designs of the VBV assemblies disclosed herein can be configured to include different values while maintaining a level of effectiveness as represented by relationship (3).

TABLE 2

| | Non-Dimensional Parametric Variable Values | | | | | | |
|---|---|---|---|---|---|---|---|
| VBV | $\frac{LA}{C}$ | $\frac{LA_{act}}{C}$ | $\frac{BA}{C^2}$ | $\frac{\Delta\theta}{2\pi}$ | $\frac{\beta_{exit}}{2\pi}$ | BVIP 304 | 306 |
| 400 | 3.1429 | 0.7429 | 1.1839 | 0.0000 | 0.2222 | 0.3665 | 3.8857 |
| 500 | 3.1429 | 1.5143 | 0.4736 | 0.0000 | 0.2222 | 0.2599 | 4.6571 |
| 700 | 3.1429 | 1.5143 | 0.0000 | 0.0000 | 0.2222 | 0.1889 | 4.6571 |
| 800 | 7.1486 | 0.7714 | 0.0000 | −0.1250 | 0.2222 | 0.0826 | 7.9200 |
| 900 | 3.1429 | 1.5143 | 0.0000 | 0.1361 | 0.2222 | 0.3046 | 4.6571 |
| 610 | 27.9412 | 0.0000 | 0.0000 | 0.0444 | 0.0222 | 0.0567 | 27.9412 |
| 612 | 0.9244 | 0.0941 | 4.2603 | 0.0000 | 0.2222 | 0.8279 | 1.0185 |
| 614 | 0.3143 | 0.1514 | 0.0000 | 0.0000 | 0.2222 | 0.1889 | 0.4657 |
| 616 | 7.1486 | 0.7714 | 0.0000 | −0.1389 | 0.1944 | 0.0472 | 7.9200 |
| 618 | 0.9925 | 0.1263 | 3.1483 | 0.0000 | 0.2222 | 0.6611 | 1.1188 |
| 620 | 22.0588 | 0.0000 | 0.0000 | 0.0444 | 0.0222 | 0.0567 | 22.0588 |
| 622 | 1.0476 | 0.5048 | 0.0000 | 0.0000 | 0.0000 | 0.0000 | 1.5524 |

Figure 10:
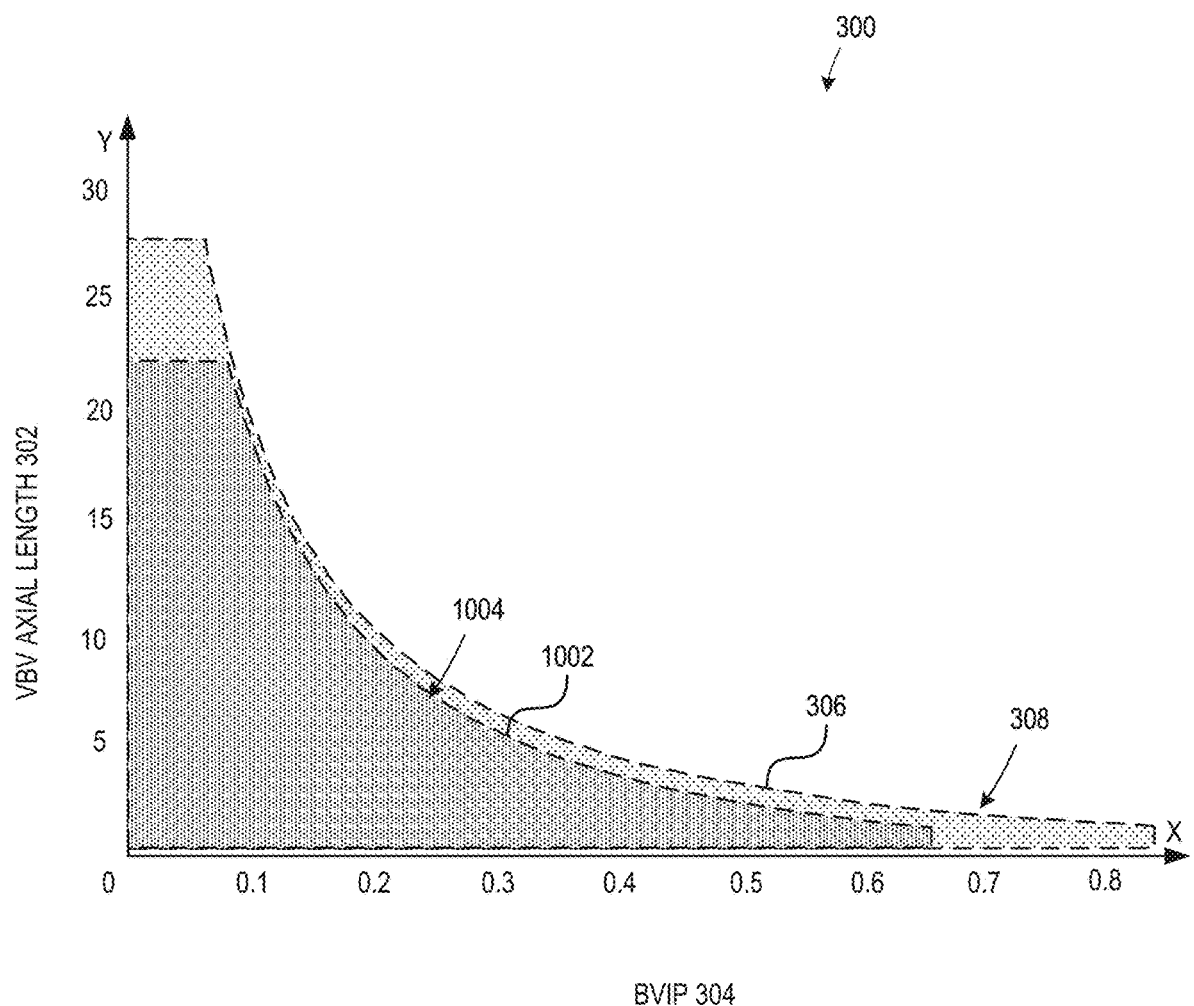
FIG. 10 illustrates the graph of FIG. 3, including another example effectiveness curve, that illustrates a relationship between a variable bleed valve axial length and a Bleed Valve Ineffectiveness Parameter (BVIP).

FIG. 10 illustrates the graph 300 of FIG. 3, where a VBV effectiveness curve 1002 is superimposed thereupon to indicate embodiments that may more suitable according to some requirements, especially as packaging requirements become more demanding. As engine packaging constraints become smaller, an axial length of a VBV assembly will also shrink. Accordingly, the narrow range is included to provide for more compact VBV assemblies that maintain a certain level of effectiveness. The VBV effectiveness curve 1002 of FIG. 10 is expressed as:

$$\frac{LA + LA_{act}}{C} - 2(BVIP + 0.15)^{-135} \leq -1.8. \qquad (4)$$

The VBV effectiveness curve 1002 is defined by (4). As engine packaging constraints become smaller, more suitably chosen VBV assemblies will tend to lie in the more reduced design space region 1004 below the VBV effectiveness curve 1002 of FIG. 10. The reduced number of designs are a result of limitations on structure, operating mechanisms, etc. The design space region 1008 is bound in the Y-axis by $$0.465 \leq \frac{LA + LA_{act}}{C} \leq 22.06.$$

The design space region 1008 is bound in the X-axis by $0 \leq BVIP \leq 0.661$.

With reference to FIG. 10 and the VBV effectiveness curve 1002, the ranges for variables are shown in Table 3, below.

TABLE 3

Non-Dimensional Parametric Variable Ranges

| Variable | Range |
|---|---|
| $\frac{LA}{C}$ (non-dimensional) | $1.049 < \frac{LA}{C} \leq 22.06$ |
| $\frac{LA_{act}}{C}$ (non-dimensional) | $0 \leq \frac{LA_{act}}{C} \leq 1.5$ |
| $\frac{BA}{C^2}$ (non-dimensional) | $0 \leq \frac{BA}{C^2} \leq 4.3$ |
| $\frac{\Delta\theta}{2\pi}$ (non-dimensional) | $-0.1389 \leq \frac{\Delta\theta}{2\pi} \leq 0.1361$ |
| $\frac{\beta_{exit}}{2\pi}$ (non-dimensional) | $-0.25 \leq \frac{\beta_{exit}}{2\pi} \leq 0.25$ |

Figure 11:
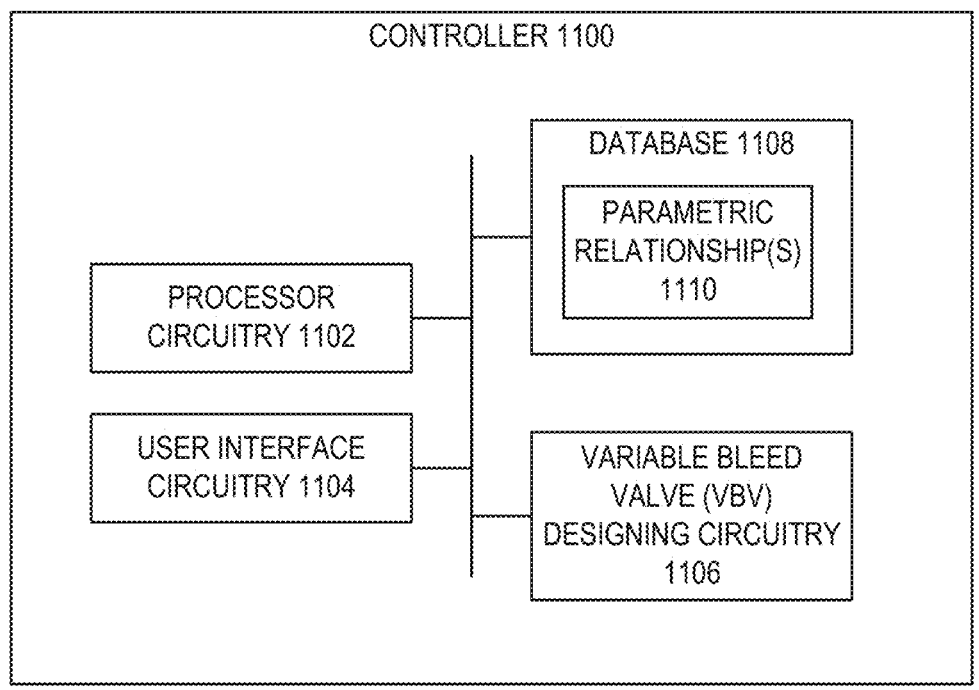
FIG. 11 is a block diagram of a controller to design an effective and compact variable bleed valve assembly in accordance with the teachings of this disclosure.

FIG. 11 is a block diagram of an example controller 1100 to design an effective compact VBV assembly based on disclosed relationships 1 and/or 2. The controller 1100 includes example processor circuitry 1102, example user interface circuitry 1104, example VBV designing circuitry 1106, and an example database 1108. The example processor circuitry 1102 is structured to execute machine readable instructions (e.g., software). The example processor circuitry 1102 is a semiconductor-based hardware logic device. In some examples, the processor circuitry 1102 implements the example VBV designing circuitry example user interface circuitry 1104 and the example user interface circuitry 1106.

The example user interface circuitry 1104 is structured to enable a user to interact with the controller 1100. For example, the user interface circuitry 1104 enables the controller 1100 to obtain information from the user via an input device and provide information to the user via an output device.

The example VBV designing circuitry 1106 is structured to determine (e.g., calculate) values of variables (e.g., example variables $$\frac{LA}{C}, \frac{LA_{act}}{C}, \frac{BA}{C^2}, \Delta\theta, \text{ and } \beta_{exit})$$

for a VBV assembly based on the disclosed relationships. Accordingly, the example database 1108 includes relationships 1110, which can correspond to expressions (1), (2), (3), and/or (4), above. In some examples, the relationships 1110 include variable ranges given in Table 1 and/or Table 2, above. The VBV designing circuitry 1106 can receive at least one variable value as an input and output at least one different variable value or range of acceptable variable values based on the relationships 1110. For example, the user can input a value for the chord, C, 226 of an upstream rotor blade 224, and receive a range of acceptable values for an axial port length, LA, 236, as an output. The user and/or the controller 1100 can select a variable value from the acceptable range of values to apply to a specific design.

Figure 12:
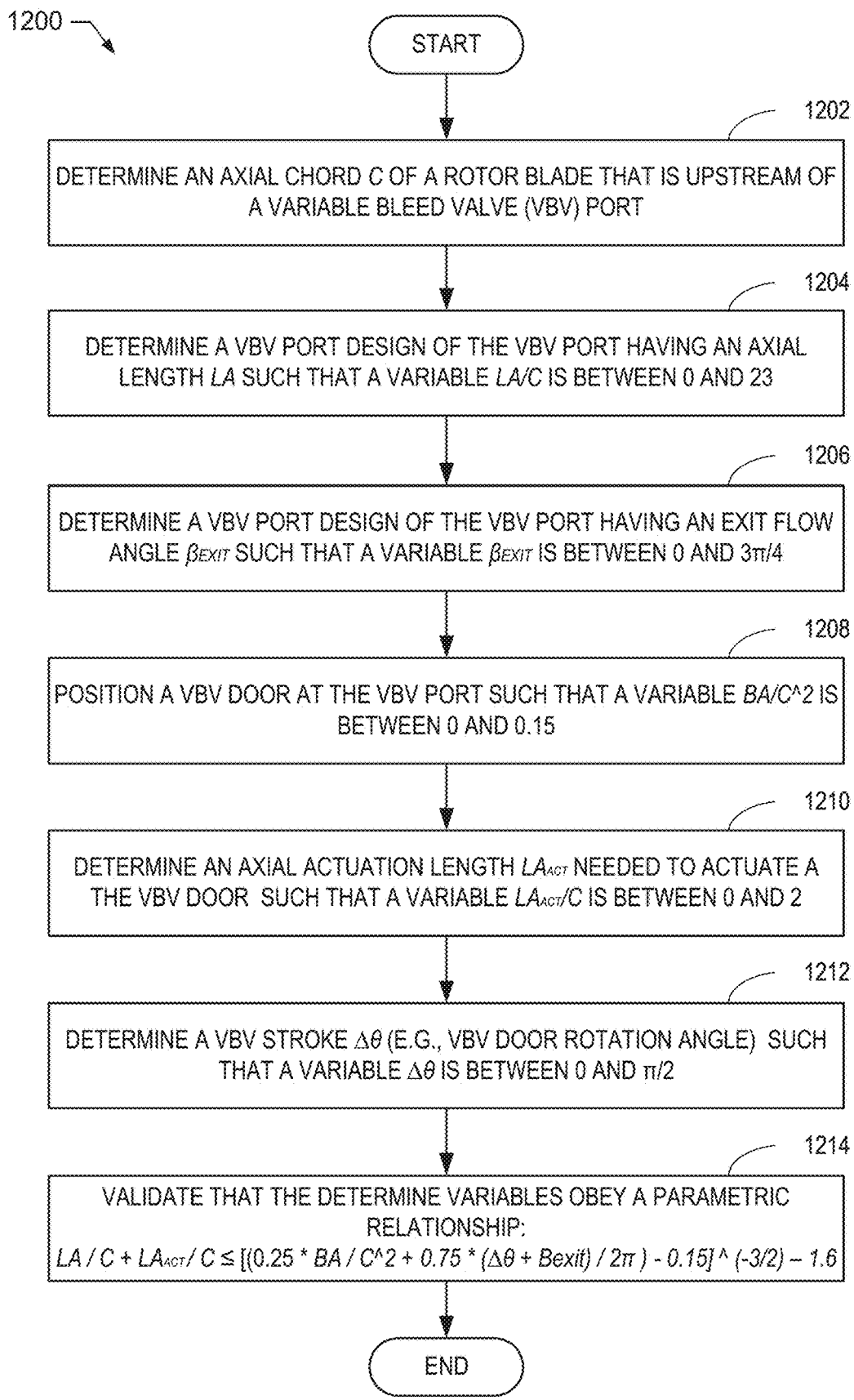
FIG. 12 is a flowchart representative of an example method for designing an effective and compact variable bleed valve assembly in accordance with the teachings of this disclosure.

FIG. 12 is a flowchart representative of an example method 1200 for designing an example VBV assembly (e.g., VBV assembly 212, 400, 500, 700, 800, 900) in accordance with the teachings of this disclosure. In some examples, the method is implemented by a human. In some examples, the method is implemented by a controller (e.g., controller 1100 of FIG. 11). In some examples, the method 1200 begins at block 1202 at which an axial chord, C, (e.g., axial chord 226) of a rotor blade (e.g., rotor blade 224) that is upstream of a variable bleed valve (VBV) port (e.g., VBV port 214) is determined. For example, the axial chord 226 of a tip of the upstream rotor blade 224 can be determined.

At block 1204, a VBV port design for the VBV port 214 having an axial length (e.g., axial port length, LA, 236) can be determined such that a variable (LA/C) is greater than 0.92 and less than or equal to 27.9. For example, the axial port length 236, which is a distance between a forward entrance lip (e.g., forward entrance lip 238 of FIG. 2A) of the VBV port 214 to an aft exit lip (e.g., aft exit lip 240) of the VBV port 214, can be determined based on the axial chord 226.

At block 1206, a VBV port design for the VBV port 214 having a VBV exit flow angle (e.g., VBV exit flow angle, βexit, 220) can be determined such that a variable (βexit/2π) is between −0.375 and 0.375. For example, the VBV exit flow angle 220 of the VBV port 214 can be determined to determine a shape of the VBV port 214 that enables such a VBV exit flow angle 220.

At block 1208, a VBV door (e.g., VBV door 228) is positioned at the VBV port 214 such that a variable (BA/C^2) is between 0 and 5.0. The VBV door 228 can be positioned at the VBV port 214 to generate a bleed cavity (e.g., bleed cavity 230) having a bleed cavity area (e.g., bleed cavity area, BA, 230a). Thus, the position of the VBV door 228 in the VBV port 214 determines the bleed cavity area, BA, 230a. As such, the VBV door 228 can be positioned with the VBV port 214 such that the variable (BA/C^2) is at least 0 and less than or equal to 5.0.

At block 1210, an axial actuation length (e.g., axial actuation length, $LA_{act}$, 242) that is needed to actuate the VBV door 228 is determined such that a variable ($LA_{act}$/C) is at least 0 and less than or equal to 2. For example, the axial actuation length 242 refers to an axial length needed for actuation (e.g., full actuation, partial actuation, etc.) of the VBV door 228 to bleed air from the VBV port 214. In other words, the axial actuation length 242 is an axial distance for the VBV door 228 to translate forward of the entrance lip 238 or aft of the exit lip 240 to open the VBV port 214 to bleed air from a booster stage (e.g., booster stage 202) of a compressor (e.g., compressor 200). Thus, having the axial chord, C, 226, the axial actuation length 242 of the VBV design can be determined such that the variable ($LA_{act}$/C) is at least 0 and less than or equal to 2.

At block 1212, a VBV stroke (e.g., VBV stroke, Δθ, 234) (e.g., VBV door 228 rotation angle) is determined such that a variable (Δθ/2π) is at least −0.25 and less than or equal to 0.25. The VBV stroke 234 refers to the rotation angle of the VBV door 228 when the VBV door 228 moves from the closed position to the open position as measured counter-clockwise from a +Z axis of a meridional plane.

At block 1214, the determine variables are validated to ensure they obey a parameter relationship (e.g., parametric relationship 1 and/or 2, above). For example, the determined variables can be applied to the parametric relationship 1, above, to determine whether the determined variables obey the parametric relationship and are within a design space (e.g., region 308) provided by a VBV effectiveness curve (e.g., VBV effectiveness curve 306) defined by parametric relationship 1.

Figure 13:
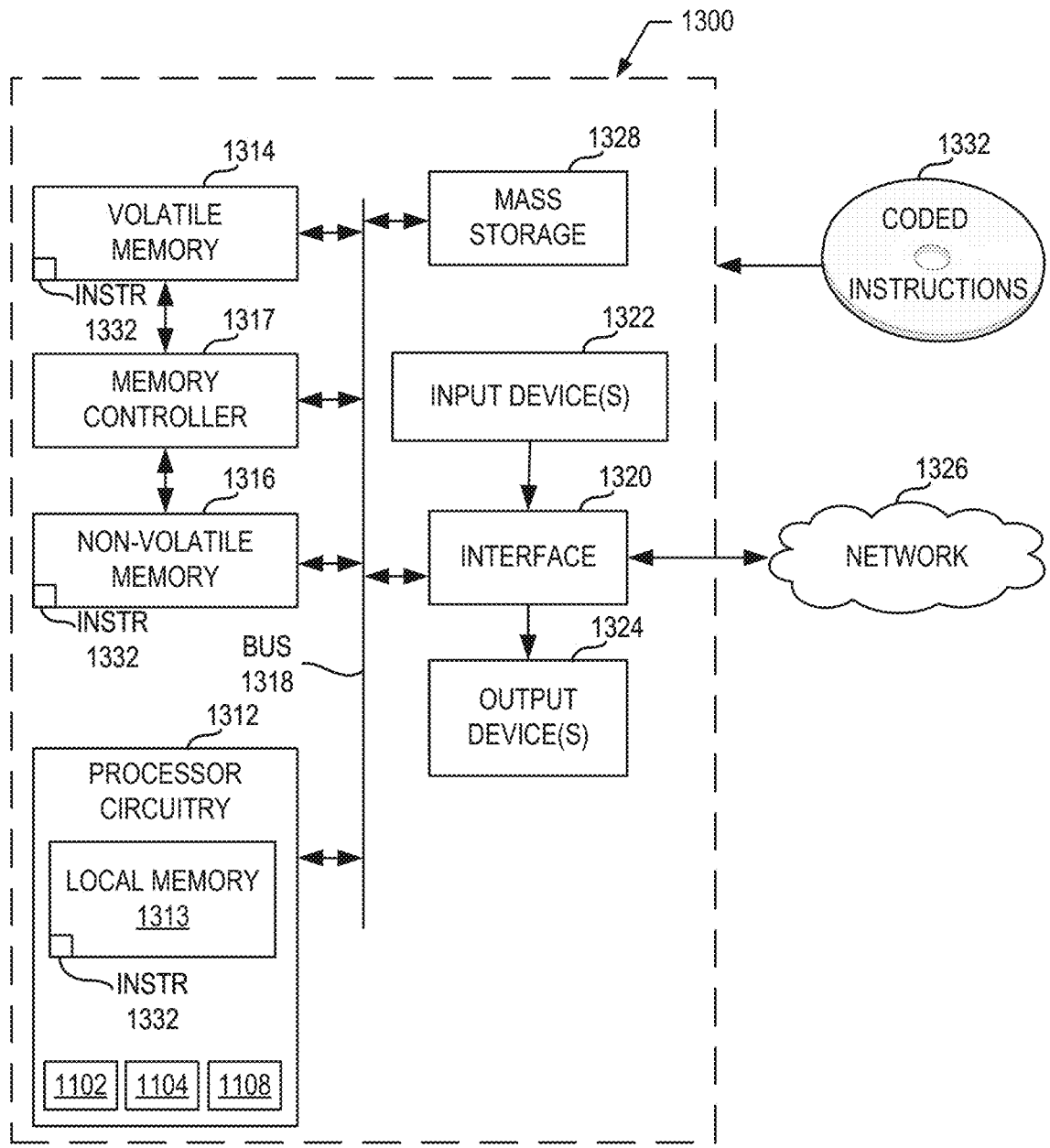
FIG. 13 is a block diagram of an example processing platform including processor circuitry structured to execute the example machine readable instructions and/or the example operations of FIG. 11 to implement the controller 1100 of FIG. 11.

FIG. 13 is a block diagram of an example processor platform 1300 structured to execute and/or instantiate the machine readable instructions and/or the operations of FIG. 12 to implement the controller 1100 of FIG. 11. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements example processor circuitry 1102, example user interface circuitry 1104, and example variable bleed valve design circuitry 1106.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1332, which may be implemented by the machine readable instructions of FIG. 11, may be stored in the mass storage device 1328, in the volatile memory 1314, in the non-volatile memory 1316, and/or on a removable non-transitory computer readable storage medium such as a CD or DVD.

Example VBV assemblies 212, 400, 500, 700, 800, 900 disclosed above have a variety of features. In some examples, a sliding door (e.g., VBV door 228) is used to open and/or close a VBV port 214. In some examples, the VBV door 228 slides through a VBV door gap 232. In some examples, a hinge is used to enable a VBV door 228 to pivot about a point to open and/or close the VBV port 214 to bleed air. In some examples, the VBV door 228 is flush with a casing 208 in a closed position. Accordingly, some examples limit or otherwise eliminate a bleed cavity 230 in a closed position. Some examples enable a VBV assembly 212, 400, 500, 700, 800, 900 to move a sub-set of VBV doors 228 between the open position and closed position.

Although each example VBV assembly 212, 400, 500, 700, 800, 900 disclosed above has certain features, it should be understood that it is not necessary for a particular feature of one example VBV assembly 212, 400, 500, 700, 800, 900 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features that are within the design space defined by expressions (1) and/or (2), above. Features of the example VBV assemblies 212, 400, 500, 700, 800, 900 disclosed above may be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that disclosed relationships enable manufacture of an advantageous VBV assemblies that are axially constrained to adhere to engine packaging constraints while maintaining a certain level of effectiveness. The relationship enables manufacture of a VBV that includes a minimal axial length while retaining an effective VBV design. Examples disclosed herein enable actuation of a VBV door that is flush with a casing in a closed position thereby eliminating a bleed cavity. Examples disclosed herein enable actuation of a VBV door that limits an impact of the bleed cavity on mainstream airflow. Examples disclosed herein enable manufacture of a variety of VBV assemblies that may be configured according to a specific turbine engine. Accordingly, examples disclosed herein enable improved operability and efficiency of a turbine engine, enable aerodynamic benefits, and improve effectiveness while limiting an axial length of the VBV assembly.

Further aspects of the present disclosure are provided by the subject matter of the following clauses:

Example 1 includes a turbine engine comprising a rotor blade having an axial chord (C) measured at a tip of the rotor blade, and a variable bleed valve (VBV) including a VBV port defining a bleed flowpath and an exit angle ($\beta_{exit}$) for bleed air exiting the VBV port, the VBV port including a forward entrance edge and an aft exit edge and a first length (LA) therebetween, the rotor blade to correspond to a first rotor blade positioned upstream of the forward entrance, and a VBV door corresponding to the VBV port, the VBV door to generate a bleed cavity having a bleed cavity area (BA) in the VBV port when the VBV is in a closed position, the VBV door to move between an open position and the closed position at a rotation angle ($\Delta\theta$), the VBV door to extend a distance ($LA_{act}$) beyond the first length (LA), wherein $$\frac{LA + LA_{act}}{C} - 2*(BVIP + 0.15)^{-1.35} \le -0.8,$$

and wherein $$BVIP = 0.15 * \frac{BA}{C^2} + 0.85 * \frac{\Delta\theta + \beta_{exit}}{2\pi}.$$

Example 2 includes the turbine engine of any preceding clause, wherein $(LA+LA_{act})/C$ is at least 0.465 and less than or equal to 27.9.

Example 3 includes the turbine engine of any preceding clause, wherein the BVIP is at least 0 and less than or equal to 0.830.

Example 4 includes the turbine engine of any preceding clause, wherein the VBV door is flush with a main flow path in the closed position to limit the bleed cavity area (BA), wherein the bleed cavity area (BA) is zero, and wherein a ratio $BA/C^2$ is zero.

Example 5 includes the turbine engine of any preceding clause, wherein $\Delta\theta/2\pi$ is at least −0.25 and is less than or equal to 0.25, and wherein $\Delta\theta/2\pi$ is not equal to 0.

Example 6 includes the turbine engine of any preceding clause, wherein $\beta_{exit}/2\pi$ is at least −0.375 and less than or equal to 0.375.

Example 7 includes the turbine engine of any preceding clause, wherein the VBV door slides between the open position and the closed position, and wherein $\Delta\theta/2\pi$ is 0.

Example 8 includes the turbine engine of any preceding clause, wherein $BA/C^2$ is greater than zero.

Example 9 includes the turbine engine of any preceding clause, wherein VBV door pivots about a pivot point to move between the open position and the closed position, and wherein a ratio $BA/C^2$ is 0.

Example 10 includes the turbine engine of any preceding clause, wherein the pivot point is within the VBV port, and wherein $\Delta\theta/2\pi$ is less than 0.

Example 11 includes the turbine engine of any preceding clause, wherein the pivot point is at the forward entrance edge, and wherein $\Delta\theta/2\pi$ is greater than 0.

Example 12 includes the turbine engine of any preceding clause, wherein $$\frac{LA + LA_{act}}{C} - 2*(BVIP + 0.15)^{-1.35} \le -1.8,$$

Example 13 includes the turbine engine of any preceding clause, wherein $(LA+LA_{act})/C$ is at least 0.465 and less than or equal to 22.06.

27

Example 14 includes the turbine engine of any preceding clause, wherein the BVIP is at least 0 and less than or equal to 0.661.

Example 15 includes the turbine engine of any preceding clause, wherein $\Delta\theta/2\pi$ is at least $-0.1389$ and less than or equal to 0.1361.

Example 16 includes the turbine engine of any preceding clause, wherein $\beta_{exit}/2\pi$ is at least $-0.25$ and less than or equal to 0.25.

Example 17 includes a turbine engine comprising at least one rotor blade having a blade tip, the blade tip having an axial chord (C), and a variable bleed valve (VBV) including a VBV port defining an exit angle ($\beta_{exit}$) for air exiting the VBV port, the VBV port including an entrance lip and an exit lip, the VBV port having an axial port length (LA) defined by a distance between the entrance lip and the exit lip, the at least one rotor blade positioned forward of the entrance lip, and a VBV door corresponding to the VBV port, the VBV door to generate a bleed cavity having an area (BA) in the VBV port when the VBV is in a closed position, the VBV door to move between an open position and the closed position at a rotation angle ($\Delta\theta$), the VBV door to extend a distance ($LA_{act}$) beyond the first length (LA); wherein the VBV is defined by an ineffectiveness parameter (BVIP); wherein $$BVIP = 0.15 * \frac{BA}{C^2} + 0.85 * \frac{\Delta\theta + \beta_{exit}}{2\pi};$$

and wherein $$\frac{LA + LA_{act}}{C} - 2*(BVIP + 0.15)^{-1.35} \leq -0.8.$$

Example 18 includes the turbine engine of any preceding clause, wherein $$\frac{LA + LA_{act}}{C}$$

is greater than or equal to 0.465 and less than or equal to 27.9, and wherein the BVIP is at least 0 and less than or equal to 0.830.

Example 19 includes the turbine engine of any preceding clause, wherein $\Delta\theta/2\pi$ is greater than or equal to $-0.25$ and less than or equal to 0.25, and wherein $\beta_{exit}/2\pi$ is at least $-0.375$ and less than 0.375

Example 20 includes the turbine engine of any preceding clause, wherein $$\frac{LA + LA_{act}}{C} - 2*(BVIP + 0.15)^{-1.35} \leq -1.8.$$

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

28

The following claims are hereby incorporated into this Detailed Description by this reference, with each claim standing on its own as a separate embodiment of the present disclosure.

What is claimed is:

1. A turbine engine comprising:
   a rotor blade having an axial chord (C) measured at a tip of the rotor blade; and
   a variable bleed valve (VBV) including:
      a VBV port defining a bleed flowpath and an exit angle ($\beta_{exit}$) for bleed air exiting the VBV port, the VBV port including a forward entrance edge and an aft exit edge and a first length (LA) therebetween, the rotor blade to correspond to a first rotor blade positioned upstream of the forward entrance edge; and
      a VBV door corresponding to the VBV port, the VBV door to generate a bleed cavity having a bleed cavity area (BA) in the VBV port when the VBV is in a closed position, the VBV door to move between an open position and the closed position at a rotation angle ($\Delta\theta$), the VBV door to extend a distance ($LA_{act}$) beyond the first length (LA);
   wherein the VBV is defined by an ineffectiveness parameter (BVIP);
   wherein $$\frac{LA + LA_{act}}{C} - 2*(BVIP + 0.15)^{-1.35} \leq -0.8;$$

and wherein $$BVIP = 0.15 * \frac{BA}{C^2} + 0.85 * \frac{\Delta\theta + \beta_{exit}}{2\pi}.$$

2. The turbine engine of claim 1, wherein $(LA+LA_{act})/C$ is at least 0.465 and less than or equal to 27.9.

3. The turbine engine of claim 1, wherein the BVIP is at least 0 and less than or equal to 0.830.

4. The turbine engine of claim 1, wherein the VBV door is flush with a main flow path in the closed position to limit the bleed cavity area (BA);
   wherein the bleed cavity area (BA) is zero; and
   wherein a ratio $BA/C^2$ is zero.

5. The turbine engine of claim 1, wherein $\Delta\theta/2\pi$ is at least $-0.25$ and is less than or equal to 0.25, and wherein $\Delta\theta/2\pi$ is not equal to 0.

6. The turbine engine of claim 1, wherein $\beta_{exit}/2\pi$ is at least $-0.375$ and less than or equal to 0.375.

7. The turbine engine of claim 1, wherein the VBV door slides between the open position and the closed position, and wherein $\Delta\theta/2\pi$ is 0.

8. The turbine engine of claim 7, wherein $BA/C^2$ is greater than zero.

9. The turbine engine of claim 1, wherein VBV door pivots about a pivot point to move between the open position and the closed position, and wherein a ratio $BA/C^2$ is 0.

10. The turbine engine of claim 9, wherein the pivot point is within the VBV port, and wherein $\Delta\theta/2\pi$ is less than 0.

11. The turbine engine of claim 9, wherein the pivot point is at the forward entrance edge, and wherein $\Delta\theta/2\pi$ is greater than 0.

12. The turbine engine of claim 1, wherein $$\frac{LA + LA_{act}}{C} - 2*(BVIP + 0.15)^{-1.35} \leq -1.8.$$

13. The turbine engine of claim 12, wherein $(LA+LA_{act})/C$ is at least 0.465 and less than or equal to 22.06.

14. The turbine engine of claim 12, wherein the BVIP is at least 0 and less than or equal to 0.661.

15. The turbine engine of claim 12, wherein $\Delta\theta/2\pi$ is at least −0.1389 and less than or equal to 0.1361.

16. The turbine engine of claim 12, wherein $\beta_{exit}/2\pi$ is at least −0.25 and less than or equal to 0.25.

17. A turbine engine comprising:
   at least one rotor blade having a blade tip, the blade tip having an axial chord (C); and
   a variable bleed valve (VBV) including:
      a VBV port defining an exit angle ($\beta_{exit}$) for air exiting the VBV port, the VBV port including an entrance lip and an exit lip, the VBV port having an axial port length (LA) defined by a first distance between the entrance lip and the exit lip, the at least one rotor blade positioned forward of the entrance lip; and
      a VBV door corresponding to the VBV port, the VBV door to generate a bleed cavity having an area (BA) in the VBV port when the VBV is in a closed position, the VBV door to move between an open position and the closed position at a rotation angle ($\Delta\theta$), the VBV door to extend a second distance ($LA_{act}$) beyond the axial port length (LA);
   wherein the VBV is defined by an ineffectiveness parameter (BVIP);
   wherein $$BVIP = 0.15 * \frac{BA}{C^2} + 0.85 * \frac{\Delta\theta + \beta_{exit}}{2\pi};$$

and
   wherein $$\frac{LA + LA_{act}}{C} - 2*(BVIP + 0.15)^{-1.35} \leq -0.8.$$

18. The turbine engine of claim 17, wherein $$\frac{LA + LA_{act}}{C}$$

is greater than or equal to 0.465 and less than or equal to 27.9, and wherein the BVIP is at least 0 and less than or equal to 0.830.

19. The turbine engine claim 17, wherein $\Delta\theta/2\pi$ is greater than or equal to −0.25 and less than or equal to 0.25, and wherein $\beta exit/2\pi$ is at least −0.375 and less than 0.375.

20. The turbine engine of claim 17, wherein $$\frac{LA + LA_{act}}{C} - 2*(BVIP + 0.15)^{-1.35} \leq -1.8.$$

* * * * *